(12) United States Patent
Cho et al.

(10) Patent No.: US 8,026,339 B2
(45) Date of Patent: Sep. 27, 2011

(54) POLYSULFONE, ELECTROLYTE MEMBRANE USING THE SAME, AND FUEL CELL USING THE ELECTROLYTE MEMBRANE

(75) Inventors: Chung-kun Cho, Yongin-si (KR); Myung-jin Lee, Yongin-si (KR); Myeong-soon Kang, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1152 days.

(21) Appl. No.: 11/756,735

(22) Filed: Jun. 1, 2007

(65) Prior Publication Data

US 2008/0102342 A1    May 1, 2008

(30) Foreign Application Priority Data

Oct. 31, 2006   (KR) .................. 10-2006-0106724

(51) Int. Cl.
    *C08G 75/00*    (2006.01)
(52) U.S. Cl. ........ 528/391; 528/125; 528/294; 528/373; 528/265; 528/290; 525/906; 525/344; 525/353; 525/535; 429/108; 429/504; 429/328; 429/479; 429/480; 429/502; 429/534
(58) Field of Classification Search ........... 528/125, 528/391, 294, 373, 265, 290; 525/906, 344, 525/353, 535; 429/108, 504, 328, 479, 480, 429/502, 534
    See application file for complete search history.

(56) References Cited

U.S. PATENT DOCUMENTS

| 4,690,766 | A | 9/1987 | Linder et al. |
| 4,797,457 | A * | 1/1989 | Guiver et al. ............ 525/534 |
| 5,525,436 | A | 6/1996 | Savinell et al. |
| 6,780,893 | B2 | 8/2004 | Sugaya et al. |
| 2005/0074654 | A1 | 4/2005 | Kiefer et al. |

FOREIGN PATENT DOCUMENTS

CN    1125635    7/1996
(Continued)

OTHER PUBLICATIONS

K. Ghosal et al., "Effect of basic Substituents on Gas Sorption and Permeation in Polysulfone," Macromolecules, vol. 29, 1996, pp. 4360-4369.

Michael D. Guiver et al., "Chemical Modification of Polysulfones II: An Efficient Method for Introducing Primary Amine Groups onto the Aromatic Chain," Macromolecules, vol. 28, No. 23, May 1995, pp. 7612-7621.

(Continued)

*Primary Examiner* — Randy Gulakowski
*Assistant Examiner* — Shane Fang
(74) *Attorney, Agent, or Firm* — Lee & Morse, P.C.

(57) ABSTRACT

A polysulfone is provided with a nitrogen-containing functional group having an affinity to an acid, an electrolyte membrane using the polysulfone, and a fuel cell including the electrolyte membrane. In particular, the polysulfone includes a nitrogen-containing functional group that has an affinity to an acid, such as a phosphoric acid, thereby having an excellent acid retaining ability. In an electrolyte membrane including the polysulfone and an acid, the amount of the retained acid can be controlled. Therefore, the electrolyte membrane has a high ionic conductivity and a high mechanical strength. A polysulfone blend of polysulfone and a thermoplastic resin prevents the dissolution of polysulfone by phosphoric acid, so that an electrolyte membrane using the polysulfone blend has an improved durability. A cross-linked reaction product of polysulfone, a cross-linking agent and a polymerization product of polysulfone, a thermoplastic resin, and a cross-linking agent strongly resist a phosphoric acid. Thus, a fuel cell using these polymerization products has a long lifetime and can operate at a high temperature and at a high efficiency.

19 Claims, 5 Drawing Sheets

FOREIGN PATENT DOCUMENTS

| | | |
|---|---|---|
| JP | 02-068146 A | 3/1990 |
| JP | 11-273695 A | 10/1999 |
| JP | 2003-022709 A | 1/2003 |
| JP | 2003-038965 A | 2/2003 |
| JP | 2005-535734 A | 11/2005 |
| WO | WO 03/016384 A2 | 2/2003 |

OTHER PUBLICATIONS

Xipeng Jiang, "Preparation of Aminomethylpolysulfone and Its Use in Combined Chemistr, Data Base of Full Text of Thesis of Excellent Doctor and Master Degrees in China (Master)," Science and Technology of Engineering I, vol. 8, 2006.

Chinese Office Action dated Feb. 12, 2010, issued in corresponding Chinese Patent Application No. 2007101025612.

Office Action issued in corresponding Korean Patent Application No. 2006-106724 dated Aug. 27, 2007.

Japanese Notice of Allowance in JP 2007-282099, dated Dec. 21, 2010 (Cho, et al.), Japanese Office Action from prosecution of corresponding Japanese application.

* cited by examiner

POLYSULFONE, ELECTROLYTE MEMBRANE USING THE SAME, AND FUEL CELL USING THE ELECTROLYTE MEMBRANE

CROSS-REFERENCE TO RELATED APPLICATIONS

This application claims the benefit of Korean Application No. 2006-106724, filed Oct. 31, 2006, in the Korean Intellectual Property Office, the disclosure of which is incorporated herein by reference.

BACKGROUND OF THE INVENTION

1. Field of the Invention

The present invention relates to a polysulfone, an electrolyte membrane using the same, and a fuel cell using the electrolyte membrane.

2. Description of the Related Art

Perfluorinated polymers are typically used as membranes in fuel cells, have a high thermochemical stability, and a high ionic conductivity. However, at an operating temperature of 100° C. or more, the ionic conductivity of perfluorinated polymers is substantially decreased because water in the membranes evaporates. In general, fuel cells operating at high temperatures of 100° C. or more, are subjected to less CO catalyst poisoning than fuel cells operating at lower temperatures, and have high catalyst activity, and therefore, a high output. In addition, the water used in fuel cells operating at high temperatures can be easily handled, and the miniaturization of fuel cells can be easily achieved. Perfluorinated polymer membranes are widely used in the field due to their high thermochemical stability and excellent mechanical properties. However, perfluorinated polymer membranes are limited to use at 100° C. or less, because the water, used in the perfluorinated polymer membranes to convey hydrogen ions, evaporates at high temperatures, and thus the ionic conductivity of the perfluorinated polymer membranes is substantially decreased. This problem can be overcome by the addition of heteropolyacid or by the formation of a composite membrane by using an inorganic material, such as SiO2.

When a composite membrane formed with heteropolyacid is used in a fuel cell, the fuel cell has an increased operating temperature. However, the heteropolyacid dissolves in water. In addition, the composite membrane has a low water retaining ability at 130° C., or more, thus decreasing the ionic conductivity of the membrane at such temperatures.

U.S. Pat. No. 5,525,436 discloses a gel-type membrane that operates at high temperatures and has polybenzimidazole complexed with a strong acid, such as a phosphoric acid or sulfuric acid. Such an acid conducts hydrogen instead of water. Although such gel-type electrolyte membranes show higher hydrogen ion conductivity, as the amount of the strong acid increases, improvements in the hydrogen ion conductivity of the gel-type electrolyte membrane are still needed.

SUMMARY OF THE INVENTION

Aspects of the present invention provide a polysulfone having an excellent acid retaining ability, a polysulfone blend including the polysulfone, a cross-linked product of the polysulfone; and an electrolyte membrane using the polysulfone, the polysulfone blend, and the cross-linked product of the polysulfones, each having a high ionic conductivity and an excellent mechanical strength.

Aspects of the present invention also provide a fuel cell, including the electrolyte membrane, having a high fuel efficiency and a high energy density.

According to an aspect of the present invention, there is provided a polysulfone including a repeating unit represented by Formula 1:

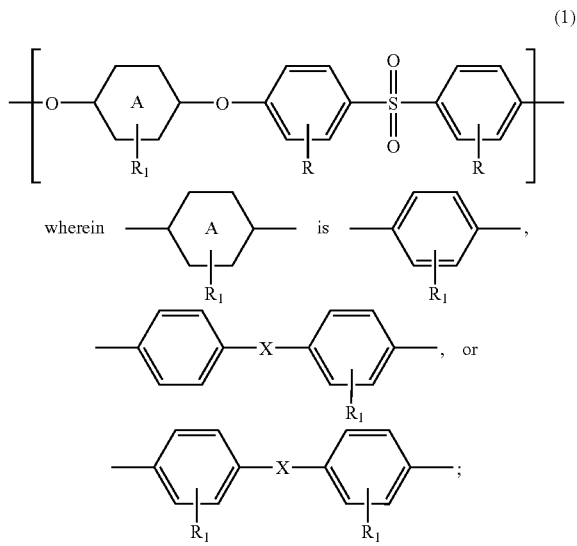

(1)

X is a single bond, —CH2—, —C(CH3)2—, —C(CF3)2—, —C(CCl3)2—, —C(=O)—, or —O—; each R1 is a single or multi-substituted substituent, and each R1 can be a primary amino group, a secondary amino group, a tertiary amino group, a quaternary ammonium salt group, a C4-C30 alkyl heteroarylpyridinium salt group, a C4-C30 aryl heteroarylpyridinium salt group, or a C4-C30 aralkyl heteroarylpyridinium salt group; and R includes at least one selected from the group consisting of hydrogen, a C1-C20 alkyl group, a C6-C20 aryl group, a C1-C20 alkoxy group, and a C6-C20 aryloxy group.

According to another aspect of the present invention, there is provided a polysulfone blend including the polysulfone and a thermoplastic resin. The thermoplastic resin includes at least one compound selected from the group consisting of polybenzimidazole, polybenzooxazole, polypyridine, and polypyrimidine, and is present in an amount of 10-80 parts by weight, based on 100 parts by weight of the polysulfone.

According to another aspect of the present invention, there is provided a cross-linked product of polysulfone that is a cross-linked reaction product of a cross-linking agent and a polymer Q. The polymer Q is selected from the polysulfone and a mixture of the polysulfone and a thermoplastic resin. The cross-linking agent is a compound having an epoxy or an isocyanate functional group and is present in an amount of 0.1-20 parts by weight, based on 100 parts by weight of the polymer Q.

According to another aspect of the present invention, there is provided an electrolyte membrane including the polysulfone and an acid. The amount of the acid may be in the range of 300-1000 parts by weight, based on 100 parts by weight of the total weight of an electrolyte membrane impregnated with the acid. The acid may include at least one acid selected from the group consisting of a phosphoric acid, a sulfuric acid, and a derivative thereof.

According to another aspect of the present invention, there is provided an electrolyte membrane including a polysulfone blend of the polysulfone and a thermoplastic resin; and an acid.

According to another aspect of the present invention, there is provided an electrolyte membrane including: a cross-linked product of the polysulfone and a cross-linking agent, or a cross-linked product of the polysulfone, a thermoplastic resin, and a cross-linking agent; and an acid.

According to another aspect of the present invention, there is provided a fuel cell including: a cathode; an anode; and the electrolyte membrane interposed between the cathode and the anode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
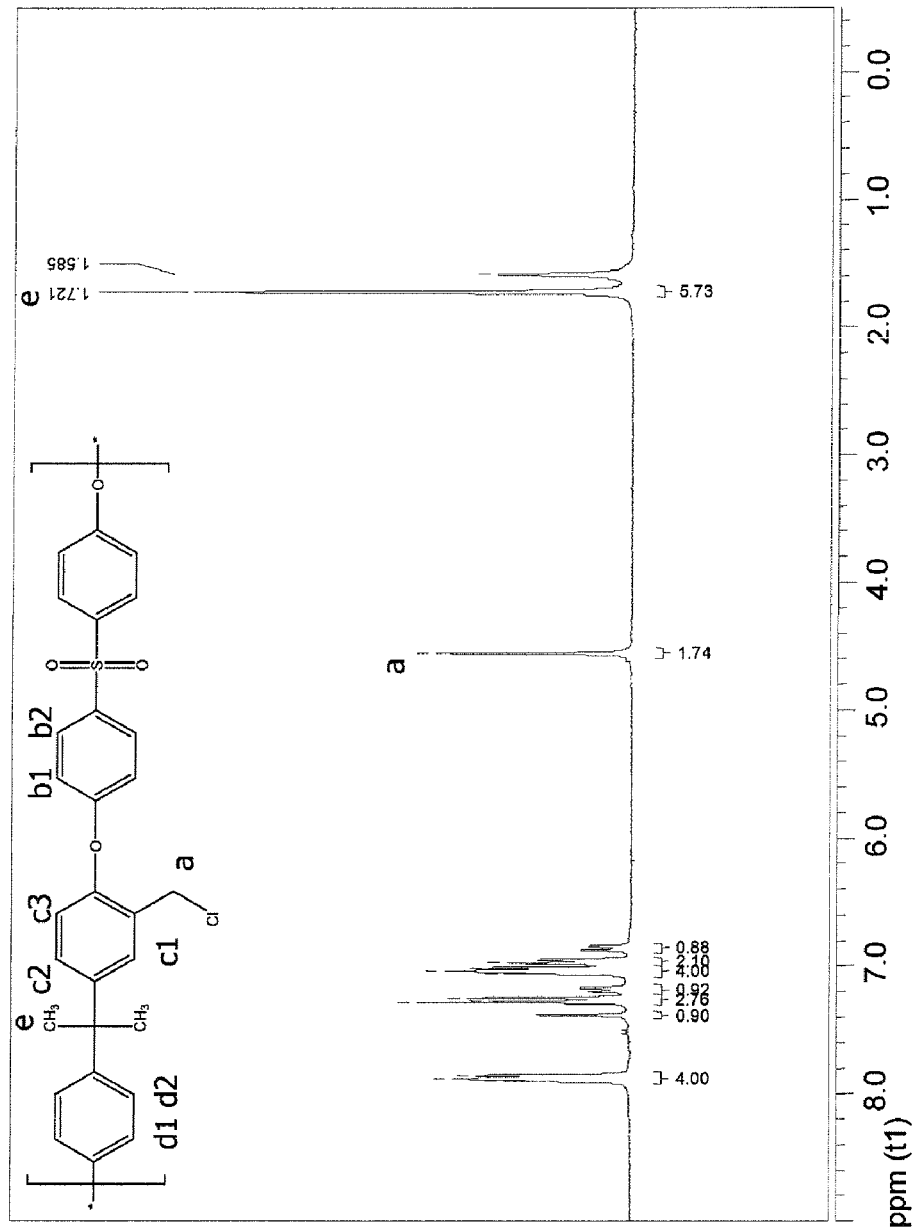
FIG. 1 is a view illustrating a nuclear magnetic resonance (NMR) spectrum of a chloromethylated polysulfone (C) obtained according to Synthesis Example 4.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A polysulfone according to an embodiment of the present invention includes a repeating unit having a nitrogen-containing functional group that has an affinity for an acid, such as a phosphoric acid. The repeating unit is represented by Formula 1 as follows:

(Formula 1)

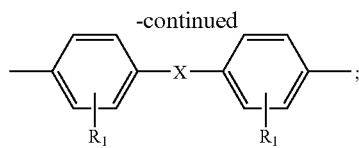

wherein —A— is

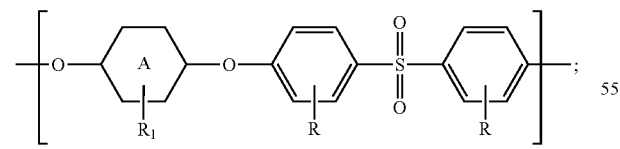

X is a single bond, —CH$_2$—, —C(CH$_3$)$_2$—, —C(CF$_3$)$_2$—, —C(CCl$_3$)$_2$—, —C(=O)—, or —O—; each R$_1$ is a single or multi-substituted substituent, and each R$_1$ can be a primary amino group, a secondary amino group, a tertiary amino group, a quaternary ammonium salt group, a C4-C30 alkyl heteroarylpyridinium salt group, a C4-C30 aryl heteroarylpyridinium salt group, or a C4-C30 aralkyl heteroarylpyridinium salt group; and R contains at least one selected from the group consisting of hydrogen, a C1-C20 alkyl group, a C6-C20 aryl group, a C1-C20 alkoxy group, and a C6-C20 aryloxy group.

The polysulfone represented by Formula 1 may have a degree of polymerization of 20-5000. In Formula 1, R$_1$ is a functional group having an affinity for an acid, and can be a primary amino group, a secondary amino group, a tertiary amino group, a quaternary ammonium salt group, a C4-C30 alkyl heteroarylpyridinium salt group, a C4-C30 aryl heteroarylpyridinium salt group, or a C4-C30 aralkyl heteroarylpyridinium salt group.

In the description of R$_1$ in Formula 1, the primary amino group, the secondary amino group, and the tertiary amino group are differentiated by the number of substituents bonded to a nitrogen atom, regardless of which carbon atom is bonded to the nitrogen atom. For example, —NH$_2$ is a primary amino group, —NH(CH$_3$) is a secondary amino group, and —N(CH$_3$)$_2$ is a tertiary amino group. The quaternary ammonium salt can be an ammonium salt group such as —N$^+$H$_3$, a trialkylammonium salt group such as —N$^+$(CH$_3$)$_3$, or a quaternary ammonium salt derived from a nitrogen-containing heteroaromatic compound. The alkyl of the trialkyl represents a C1-C20 alkyl group.

The C4-C30 alkyl heteroarylpyridinium salt group can be represented by the following formula, in which R' is an alkyl group and B is a heteroarylene group:

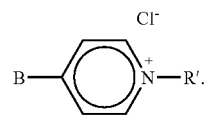

The C4-C30 aryl heteroarylpyridinium salt group can be can be represented by the following formula, in which R' is an aryl group and B is a heteroaryl group:

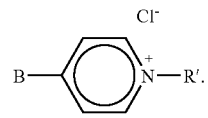

The C4-C30 aralkyl heteroarylpyridinium salt group can be represented by the following formula:

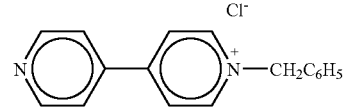

For example, the C4-C30 aralkyl heteroarylpyridinium salt group can be a group in which an aralkyl group, such as a benzyl group, is bonded to a pyridinium salt group, and the pyridinium salt group is connected to a heteroaryl group, for example, a pyridyl group, a group derived from a 4,4-dipyridyl derivative, or the like.

$R_1$ can be represented by one of the following formulae:

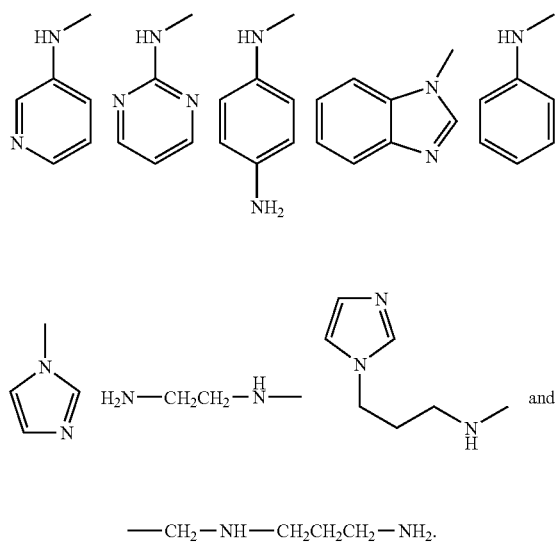

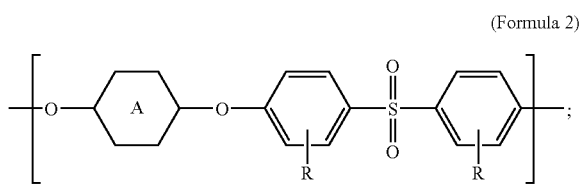

and

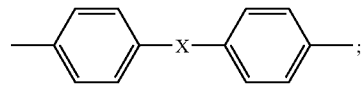

A polysulfone according to another embodiment of the present invention may include a copolymer having the repeating unit represented by Formula 1 and a repeating unit represented by Formula 2, as follows:

(Formula 2)

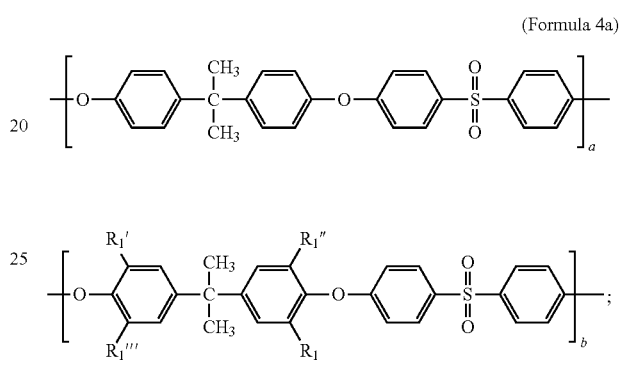

and R contains at least one group selected from the group consisting of a hydrogen, a C1-C20 alkyl group, a C6-C20 aryl group, a C1-C20 alkoxy group, and a C6-C20 aryloxy group.

In the copolymer, the repeating unit represented by Formula 1 has an affinity for an acid and therefore improves ion conductivity. The repeating unit represented by Formula 2 has more flexibility than the repeating unit represented by Formula 1 and therefore contributes to the mechanical properties and the solubility of the polysulfone.

A polysulfone copolymer according to aspects of the present invention may have a degree of polymerization (DP) of 20-5000. In the polysulfone copolymer, the amount of the repeating unit represented by Formula 1 may be in the range of 0.01-0.99 moles, and in particular, 0.4-0.99 moles. The amount of the repeating unit represented by Formula 2 may be in the range of 0.01-0.99 moles, and in particular, 0.01-0.6 moles. When the repeating unit represented by Formula 1 and the repeating unit represented by Formula 2 are mixed in the amounts described above, the polysulfone has an excellent acid retaining ability, solubility, and mechanical properties.

The copolymer can be represented by Formula 4a:

(Formula 4a)

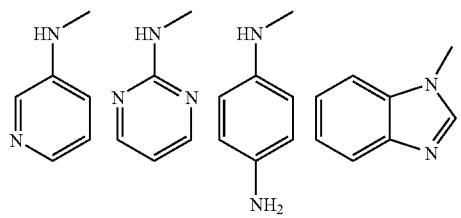

wherein $R_1$, $R_1'$, $R_1''$, and $R_1'''$ are each selected from one of the groups represented by:

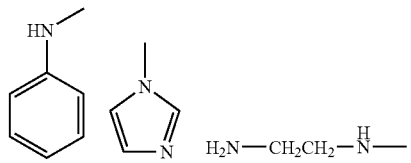

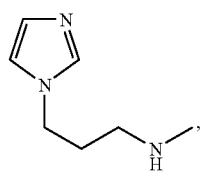

and $-CH_2-NH-CH_2CH_2CH_2-NH_2$; $R_1$, $R_1'$, $R_1''$, and $R_1'''$ are not all hydrogens at the same time; a is in the range of 0.01-0.6; and b is in the range of 0.4-0.99.

The copolymer represented by Formula 4a can be a compound represented by Formula 4:

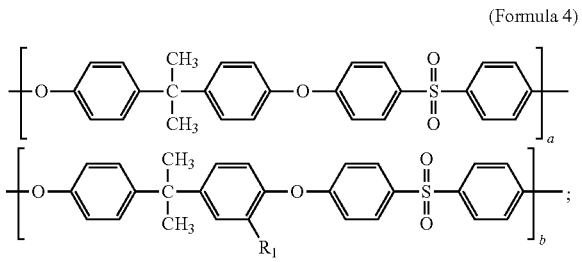

(Formula 4)

wherein $R_1$ is represented by one of the formulae below:

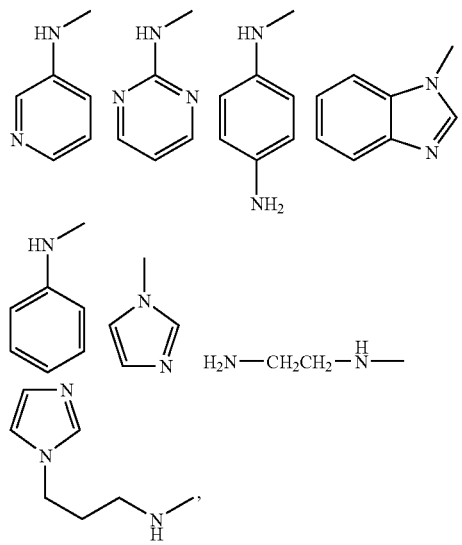

and
—$CH_2$—NH—$CH_2CH_2CH_2$—$NH_2$; a is in the range of 0.01-0.6; and b is in the range of 0.4-0.99.

A polysulfone represented by Formula 4a or Formula 4 may have a degree of polymerization of 20-5000.

The polysulfone represented by Formula 4 can be a compound represented by Formula 5:

(Formula 5)

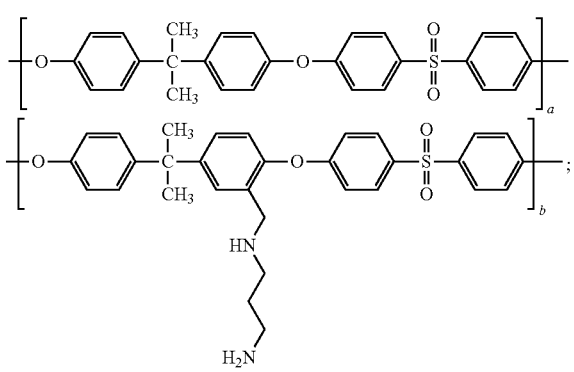

wherein a is in the range of 0.01-0.6, and in particular, 0.1-0.5; and b is in the range of 0.4-0.99, and in particular, 0.5-0.9. The polysulfone represented by Formula 5 may have a degree of polymerization of 20-5000.

A polysulfone according to another embodiment of the present invention may include a terpolymer having the repeating unit represented by Formula 1, the repeating unit represented by Formula 2, and the repeating unit represented by Formula 3:

(Formula 3)

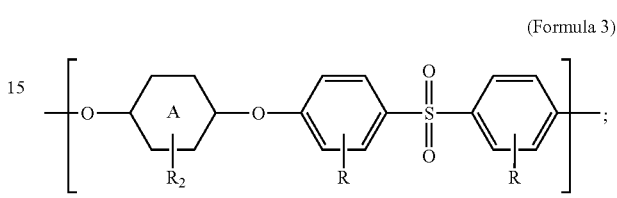

wherein 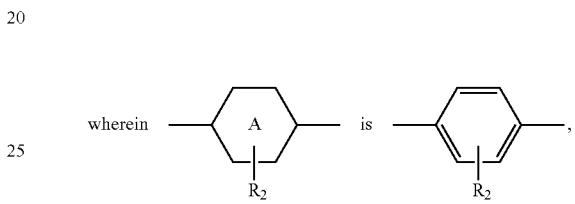

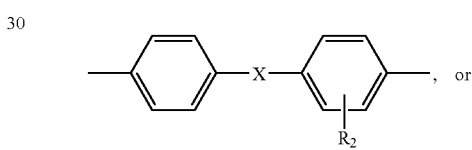, or

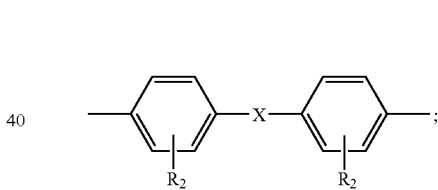;

$R_2$ is selected from the group consisting of a C1-C20 alkyl group, a C1-C20 alkoxy group, a C6-C20 aryl group, a C6-C20 aryloxy group, a C7-C20 arylalkyl group, and —$CH_2O(CH_2CH_2O)_nCH_3$; n is an integer from 1 to 20; and R is selected from the group consisting of a hydrogen, a C1-C20 alkyl group, a C6-C20 aryl group, a C1-C20 alkoxy group, and a C6-C20 aryloxy group.

In the repeating unit represented by Formula 3, $R_2$ improves the flexibility of the chain so that the mechanical properties and the solubility, in an organic solvent, of the polysulfone can be improved.

In the terpolymer, the repeating unit of Formula 1 may be present in an amount of 0.6-0.9 moles, the repeating unit of Formula 2 may be present in an amount of 0.1-0.3 moles, and the repeating unit of Formula 3 may be present in an amount of 0.05-0.3 moles. The polysulfone terpolymer may have a degree of polymerization of 20-5000. The polysulfone terpolymer can be a compound having a repeating unit represented by Formula 6a:

(Formula 6a)

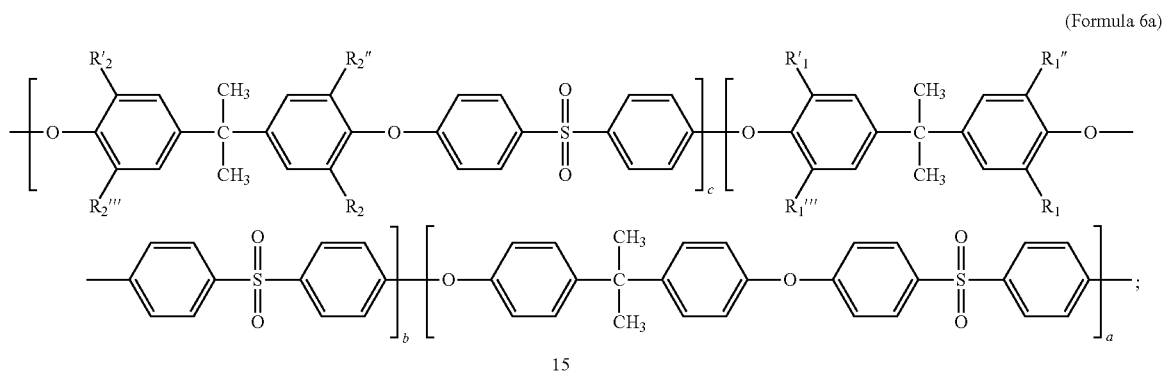

wherein $R_1$, $R_1'$, $R_1''$, and $R_1'''$ are each represented by one of the formulae below:

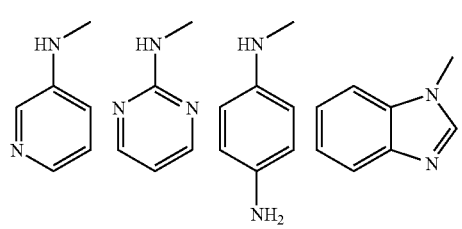

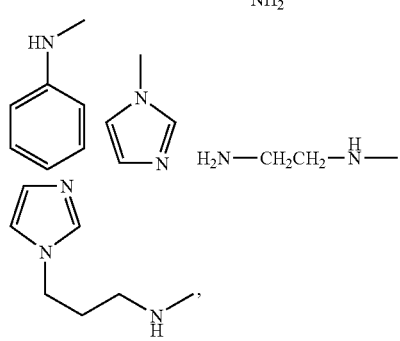

and
$CH_2—NH—CH_2CH_2CH_2—NH_2$; $R_1$, $R_1'$, $R_1''$, and $R_1'''$ are not all hydrogen at the same time; a is in the range of 0.1-0.3; b is in the range of 0.6-0.9; c is in the range of 0.05-0.3; and $R_2$, $R_2'$, $R_2''$, and $R_2'''$ are each independently hydrogen or —$CH_2O(CH_2CH_2O)_nCH_3$, where n is an integer from 1 to 20, and $R_2$, $R_2'$, $R_2''$, and $R_2'''$ are not all hydrogen at the same time.

The compound represented by Formula 6a can be a compound having a repeating unit represented by Formula 6:

wherein $R_1$ is represented by one of the formulae below:

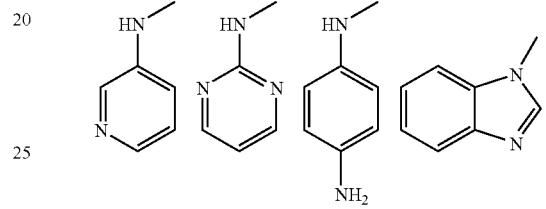

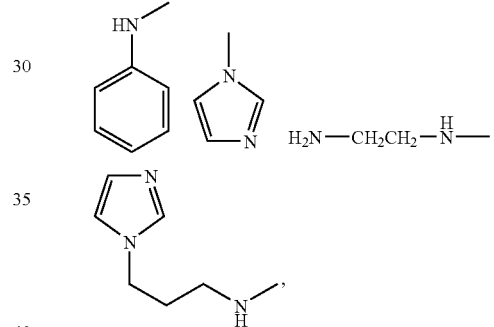

and
—$CH_2$—NH—$CH_2CH_2CH_2$—$NH_2$; a is in the range of 0.1-0.3; b is in the range of 0.5-0.95; c is in the range of 0.05-0.3; and $R_2$ is —$CH_2O(CH_2CH_2O)_nCH_3$ where n is an integer from 1 to 20. The polysulfone represented by Formula 6 may have a degree of polymerization of 20-5000. The polysulfone represented by Formula 6 can be a terpolymer having a repeating unit represented by Formula 7:

(Formula 6)

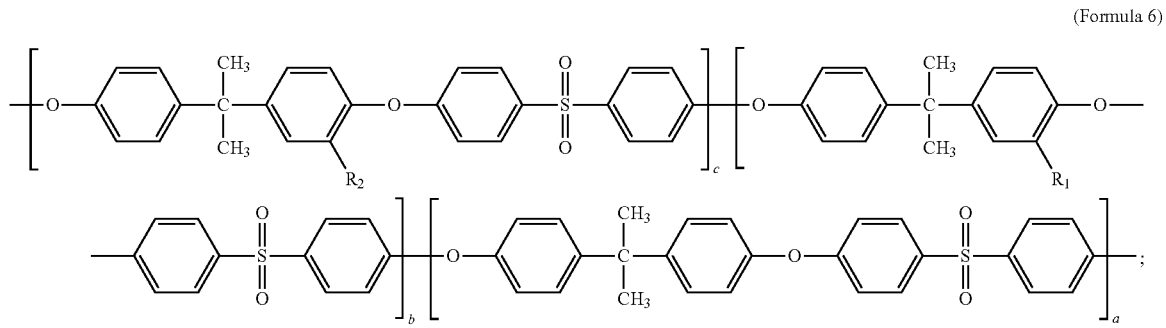

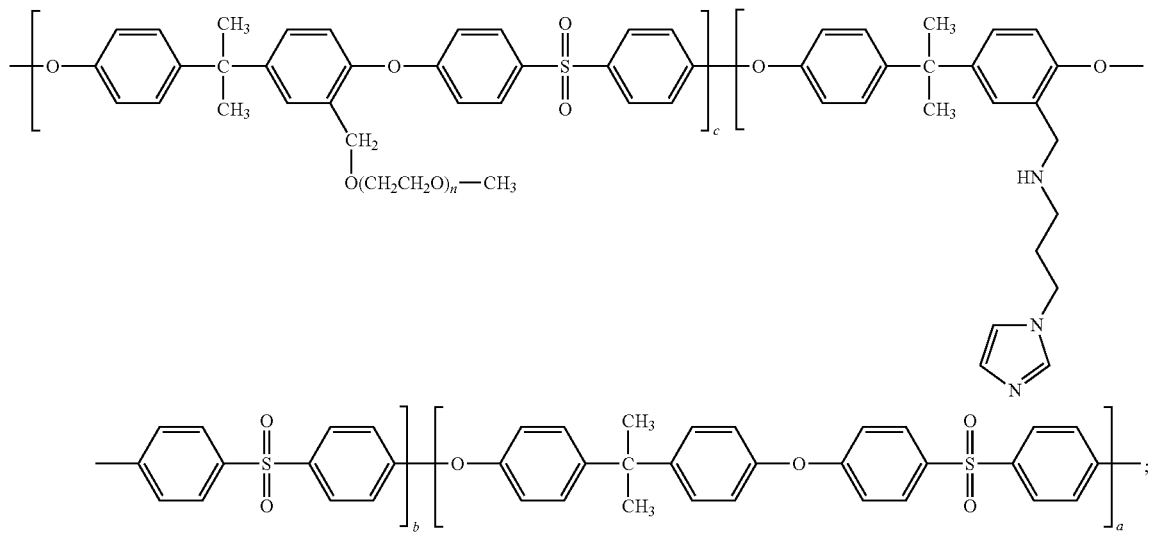

(Formula 7)

wherein a is in the range of 0.1-0.3; b is in the range of 0.6-0.9; c is in the range of 0.05-0.3; and n is an integer from 1 to 20.

The polysulfones represented by Formula 6a, Formula 6, and Formula 7 may have a degree of polymerization of 20-5000.

In a polysulfone, according to aspects of the present invention, as the amount of $R_1$, of a repeating unit represented by Formula 1, increases, the amount of a functional group which can be complexed with a strong acid, such as a phosphoric acid, increases. Therefore, the capability of the polysulfone to retain a strong acid is increased. The number of introduced $R_1$'s may be from 0.1-2, and in particular, 0.4-1.5, per repeating unit of the polysulfone. When the number of introduced $R_1$'s is greater than 1.5, the amount of retained acid is so high that the mechanical strength of the polysulfone is decreased. On the other hand, when the number of $R_1$'s introduced is less than 0.4, the number of sites to which an acid can be complexed is decreased so that limited or no ion conductivity improvement is detected.

In the repeating unit represented by Formula 3, the number of introduced $R_2$'s may be 0.01-0.3 per repeating unit of the polysulfone. When the number of $R_2$'s introduced is greater than 0.3, the number of sites to which an acid can be complexed is decreased, and the ionic conductivity of the polysulfone is decreased. On the other hand, when the number of introduced $R_2$'s is less than 0.01, the flexibility of the electrolyte membrane is decreased.

Each of the polysulfone including the repeating unit represented by Formula 1, the polysulfone including the repeating unit represented by Formula 1 and a repeating unit represented by Formula 2, and the polysulfone including the repeating unit represented by Formula 1, the repeating unit represented by Formula 2, and the repeating unit represented by Formula 3 may have an average molecular weight of 10,000-500,000, and in particular 20,000-300,000. When the weight average molecular weight of these polysulfones is less than 10,000, electrolyte membranes using these polysulfones have a low mechanical strength. When the weight average molecular weight of these polysulfones is greater than 500,000, the solubility of these polysulfones, with respect to a solvent, is decreased.

A method of preparing a polysulfone, according to aspects of the present invention, will now be described in detail. A method of preparing a polysulfone, including the repeating unit represented by Formula 1, will be described in detail.

A polysulfone, including the repeating unit represented by Formula 2, is subjected to chloromethylation to obtain a chloromethylated compound (A). Reaction conditions for the chloromethylation are not limited herein, in that any suitable reaction conditions can be used. For example, the chloromethylation can be performed in the presence of $SnCl_4$/$(CH_3)_3SiCl$ and paraformaldehyde, at 30-60° C. During the chloromethylation, the amount of —$CH_2Cl$ to be introduced, that is, the amount of $R_1$ can be controlled to a desired range by adjusting the reaction time and/or the reaction temperature.

The chloromethylated compound (A) is subjected to an amination reaction to obtain a polysulfone including a repeating unit represented by Formula 1. The amination reaction is performed by reacting the chloromethylated compound (A) with an amine compound, such as ethylenediamine. The temperature for the amination reaction may vary according to the kind of the chloromethylated compound (A) and the kind of the amine compound used. The reaction can be performed at 50-150° C.

[Reaction Scheme 1]

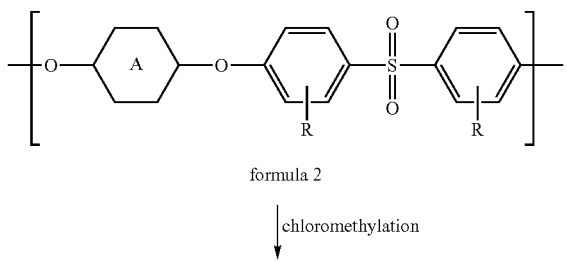

formula 2 chloromethylation

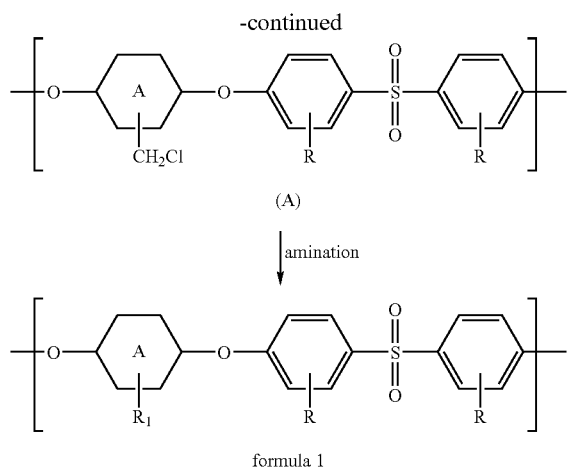

(A)

↓ amination formula 1 wherein

$R_1$, $R_2$, and R are as described above with reference to Formulae 1 and 2.

The chloromethylated compound (A), of Reaction Scheme 1, can be identified using nuclear magnetic resonance (NMR) analysis. The polysulfone including the repeating unit represented by Formula 1 has low solubility with respect to an organic solvent so that its identification through the NMR analysis was impossible. The chloromethylated compound (A) and the polysulfone, including the repeating unit represented by Formula 1, can be identified by measuring the degree of impregnation with a phosphoric acid, and —NH can be identified through IR analysis. In other words, the chloromethylated compound (A) is not impregnated with a phosphoric acid, due to its structural characteristics. The polysulfone including the repeating unit represented by Formula 1 has an excellent phosphoric acid retaining ability due to the presence of an $R_1$ that is an amino group having an affinity with respect to an acid, such as a phosphoric acid. Accordingly, the polysulfone including the repeating unit represented by Formula 1 can be indirectly identified by a change in a phosphoric acid retaining ability, and —NH can be identified through IR analysis spectrum.

The polysulfone having the repeating unit represented by Formula 3 can be prepared according to Reaction Scheme 2.

A polysulfone including a repeating unit represented by Formula 2 is subjected to chloromethylation to obtain a chloromethylated compound (A). Reaction conditions for the chloromethylation are not limited herein, in that any suitable reaction conditions can be used. For example, the chloromethylation can be performed in the presence of $SnCl_4$/ $(CH_3)_3SiCl$ and paraformaldehyde, at 30-60° C. During the chloromethylation, the amount of —$CH_2Cl$ introduced, that is, the amount of $R_1$ can be controlled to a desired range by adjusting the reaction time and/or the reaction temperature.

The chloromethylated compound (A) is subjected to a flexible chain-grafting reaction to obtain a polysulfone including a repeating unit represented by Formula 3. The flexible chain-grafting reaction is performed by reacting the chloromethylated compound (A) with an alcohol compound, such as methoxypolypropyleneglycol.

The temperature for the flexible chain-grafting reaction may vary according to the kind of the chloromethylated compound (A) and the kind of the alcohol compound used, and can be performed at 20-40° C., in particular, 20-25° C.

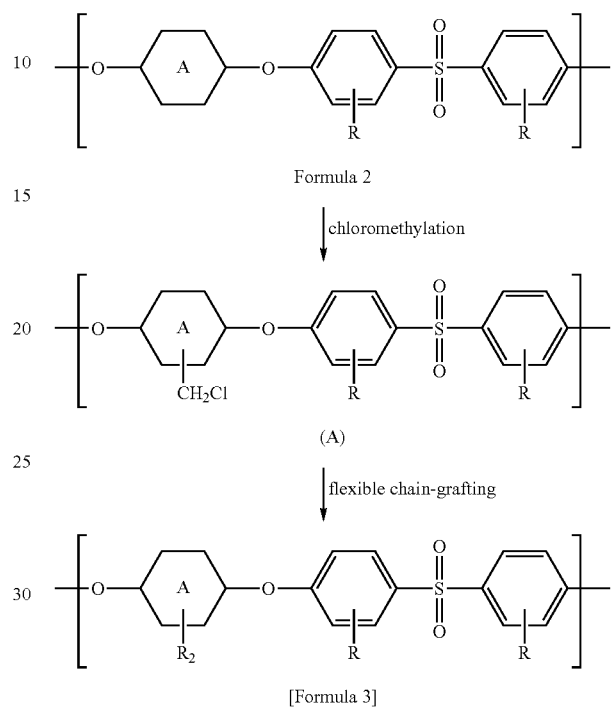

The polysulfones represented by Formulae 4a and 6a can be prepared in a similar manner as described above.

Aspects of the present invention also provide a polysulfone blend containing a polysulfone, according to aspects of the present invention, and a thermoplastic resin, according to an embodiment of the present invention.

The thermoplastic resin can be a basic polymer, such as polybenzimidazole, polybenzooxazole, polypyridine, or polypyrimidine; polysulfone; polyetherimide; polyarylether; or polyarylketone. When the thermoplastic resin is mixed with a polysulfone that includes a functional group having an affinity with respect to an acid, possible difficulties, occurring when a high viscosity solution is prepared using the polysulfone alone, can be prevented.

The amount of the thermoplastic resin may be in the range of 10-80 parts by weight, based on 100 parts by weight of the polysulfone. When the amount of the thermoplastic resin is less than 10 parts by weight, no addition effects occur. When the amount of the thermoplastic resin is greater than 80 parts by weight, the ionic conductivity of an electrolyte membrane using the polysulfone blend is decreased.

According to an embodiment of the present invention, a cross-linked product of a polysulfone prepared using a polysulfone, according to aspects of the present invention, is provided. The cross-linked product of the polysulfone can be formed through a two-component cross-linking reaction of a polysulfone and a cross-linking agent or a three-component cross-linking reaction of a polysulfone, a thermoplastic resin, and a cross-linking agent.

The cross-linking reaction of the polysulfone and the cross-linking agent is performed by mixing the polysulfone, the cross-linking agent, and a solvent, and then heating the resultant mixture at 60-150° C. The cross-linked reaction of the polysulfone, the cross-linking agent, and the thermoplastic resin is performed by mixing the polysulfone, the cross-linking agent, the thermoplastic resin, and a solvent, and then heating the resultant mixture at 60-150° C.

The solvent used during the cross-linking reaction can be dimethylacetamide(DMAc), dimethylformamide(DMF), dimethylsulfoxide(DMSO), or N-methylpyrrolidone(NMP), and can be in the range of 5-30 parts by weight, based on 100 parts by weight of the polysulfone.

The cross-linking agent can be any compound having an epoxy group or an isocyanate group. For example, the cross-linking agent may be a N,N-diglycidyl-4-glycidyloxyaniline represented by the formula below, diethylene glycol diglycidyl ether, bisphenol A diglycidyl ether, glycerol diglycidyl ether, ethylene glycol diglycidyl ether, methylenediphenyidiisocyanate, toluenediisocyanate, or hexamethylenediisocyanate:

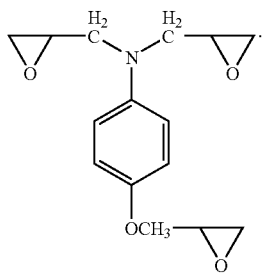

When the two-component cross-linking reaction of the polysulfone with the cross-linking agent is performed, the amount of the cross-linking agent may be in the range of 0.1-20 parts by weight, based on 100 parts by weight of polysulfone. When the three-component cross-linking reaction of the polysulfone with the thermoplastic resin and the cross-linking agent is performed, the amount of the cross-linking agent may be in the range of 0.1-20 parts by weight, based on 100 parts by weight of the total weight of polysulfone and the thermoplastic resin.

In both cases, when the amount of the cross-linking agent is less than 0.1 parts by weight, no cross linking effects occurs. When the amount of the cross-linking agent is greater than 20 parts by weight, the phosphoric acid retaining ability of an electrolyte membrane using the cross-linking product is substantially decreased.

In the polysulfone blend and the cross-linked product of the polysulfone, the polysulfone can be a compound represented by Formula 4:

(Formula 4)

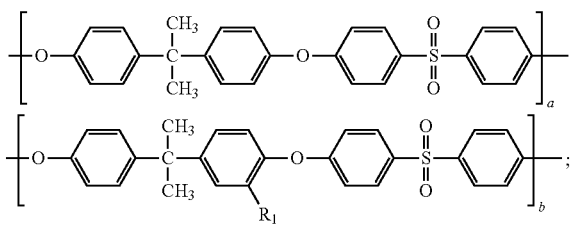

wherein $R_1$ is represented by one of the following formulae:

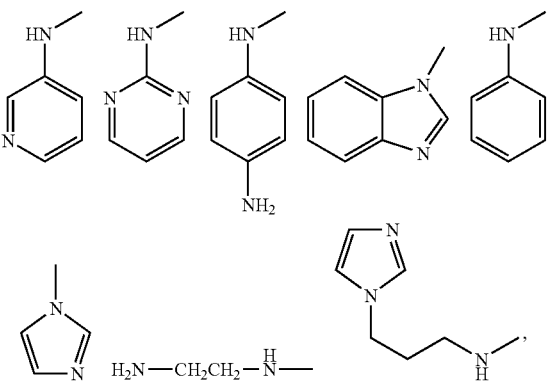

and
—$CH_2$—NH—$CH_2CH_2CH_2$—$NH_2$; a is in the range of 0.01-0.6; and b is in the range of 0.4-0.99.

A method of manufacturing an electrolyte membrane using a polysulfone according to aspects of the present invention will now be described in detail.

First, a polysulfone, according to aspects of the present invention, is dissolved with a solvent to obtain an electrolyte membrane forming composition. The electrolyte membrane forming composition is coated on a separate support and dried. Then the formed membrane is separated from the support to obtain an electrolyte membrane. The solvent used can be dimethyl acetamide, dimethylformamide, N-methylpyrrolidone, or dimethylsulfoxide, and may be present in amounts of 300-3000 parts by weight, based on 100 parts by weight of the polysulfone. When the amount of the solvent is outside this range, it is difficult to form an electrolyte membrane in the form of a film. The support can be any substrate that can support the electrolyte membrane, for example, a glass substrate, a polyimide film, or a polyester film. The drying can be performed at 60-180° C.

The electrolyte membrane can be manufactured differently from the method described above. For example, the electrolyte membrane forming composition can be directly coated on an electrode and dried, to form an electrolyte membrane.

The electrolyte membrane, obtained as described above, is impregnated with an acid. The acid used may include at least one acid selected from the group consisting of a phosphoric acid, a sulfuric acid, and a derivative thereof. The derivative of the phosphoric acid can be an alkyl phosphonic acid, such as ethylphosphonic acid or methylphosphonic acid; or an alkyl phosphate, such as ethyl phosphate or methyl phosphate. The amount of the acid may be in the range of 300-1000 parts by weight, based on 100 parts by weight of the total weight of the electrolyte membrane impregnated with the acid.

Through the acid impregnation process, a nitrogen-containing functional group introduced to polysulfone is protonized to have a positive charge and then complexed with a negative ion of the acid used in this way the fluidity of the acid is decreased and the acid retaining ability of the polysulfone is improved. Therefore, when a fuel cell operates, loss of the acid can be prevented, and the ionic conductivity of the electrolyte membrane is maintained for a long period of time. Accordingly, the durability of the fuel cell is improved.

In the current embodiment, the concentration of the acid is not limited. For example, when the acid used is a phosphoric acid, an 85 wt % phosphoric acid aqueous solution is used. The impregnation with the phosphoric acid may be performed for 1 minute-2 hours, and preferably for 10-60 minutes, at 80° C.

A method of manufacturing an electrolyte membrane using a polysulfone blend, according to aspects of the present invention, is the same as the above method of manufacturing an electrolyte membrane using polysulfone, except that the blend of polysulfone and a thermoplastic resin is used instead of polysulfone.

A method of manufacturing an electrolyte membrane using a cross-linked product of polysulfone according to aspects of the present invention is the same as the above method of manufacturing an electrolyte membrane using polysulfone, except that the electrolyte membrane forming composition consists of different components, and a heat treatment process is used to perform a cross-linking reaction of polysulfone with a cross-linking agent.

A polysulfone and a cross-linking agent are dissolved with a solvent to obtain an electrolyte membrane forming composition, and then the electrolyte membrane forming composition is coated on a separate support, dried, and heat treated to form a cross-linked product of polysulfone. The resultant film is separated to obtain an electrolyte membrane.

An electrolyte membrane formed of a cross-linked product of polysulfone, a thermoplastic resin, and a cross-linking agent can be obtained using the previously described method of manufacturing an electrolyte membrane using a cross-linked product of polysulfone, except that a thermoplastic resin is used in addition to polysulfone and a cross-linking agent.

The electrolyte membrane is subjected to an acid impregnation process as described above. The electrolyte membrane may have a thickness of 10-300 μm. The electrolyte membrane can be used as a hydrogen ion conductive membrane of a fuel cell.

A method of manufacturing a membrane and electrode assembly (MEA) of a fuel cell will now be described in detail. In the present specification, an MEA refers to an electrolyte membrane on which a catalyst layer and an electrode are sequentially deposited on both sides of the electrolyte membrane.

The MEA can be manufactured by locating an electrode, including a catalyst layer, onto both sides of the electrolyte membrane obtained as described above and then assembling the resultant structure at high temperature and a high pressure. Alternatively, the MEA can be manufactured by coating a catalyst metal that causes an electrochemical catalyst reaction onto a polymer membrane and then assembling a fuel diffusion layer to the coated polymer membrane. The assembling is performed by heating the resultant structure until a hydrogen ion conductive layer is softened (for example, at about 125° C. for Nafion) and then applying a pressure of 0.1-3 ton/cm². The applied pressure can preferably be about 1 ton/cm². A bipolar plate is installed on both sides of the MEA to complete the fuel cell. The bipolar plate has pores to supply a fuel and acts as a current collector.

In the method of manufacturing the MEA, the catalyst used can be Pt, a Pt alloy, or a mixture thereof. The Pt alloy can include at least one metal selected from the group consisting of Au, Pd, Rh, Ir, Ru, Sn, and Mo.

The type of fuel cell according to the various embodiments of the present invention is not limited. The fuel cell can be a polymer electrolyte membrane (PEM) fuel cell.

The electrolyte membrane according to aspects of the present invention is useful as an electrolyte membrane of a high temperature fuel cell. A fuel cell including such an electrolyte membrane has an excellent acid retaining ability. When the fuel cell operates, the loss of an acid can be prevented, and the fuel cell can have an improved durability. The polysulfone which forms an electrolyte membrane has a nitrogen-containing functional group so that the amount of an acid retained can be controlled. The polysulfone has excellent ionic conductivity, excellent mechanical strength, and an MEA using the polysulfone can be easily manufactured in large numbers.

The present invention will be described in further detail with reference to the following examples. These examples are for illustrative purposes only and are not intended to limit the scope of the present invention.

Synthesis Example 1

Synthesis of Polysulfone-Ethylenediamine-1 (PSF-ED-1)

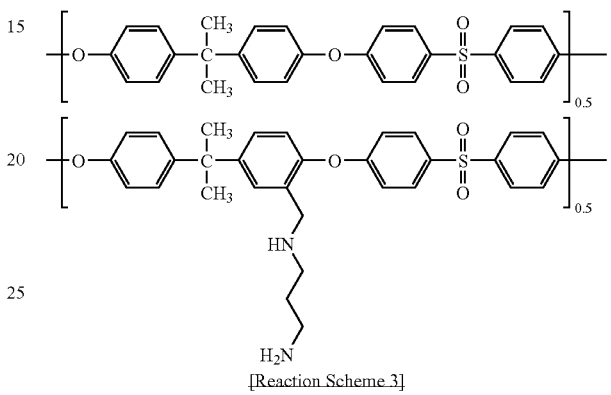

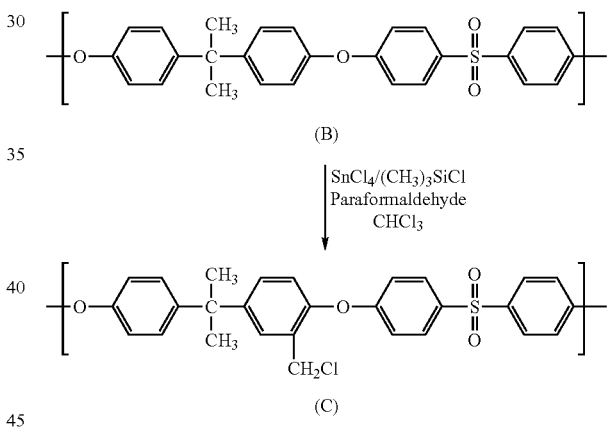

Referring to Reaction Scheme 3, 750 ml of chloroform and 14.88 g of polysulfone(B) were added to a 1000 ml round bottom flask and completely dissolved by mixing at room temperature. 10 g of paraformaldehyde, 0.8 ml of SnCl₄, and 42.5 ml of (CH₃)₃SiCl were added to the reaction product and then reacted at 50° C. for 20 hours.

When the reaction was completed, the resultant solution was precipitated in methanol and was then filtered. The powder obtained from the filtering was vacuum dried at room temperature to obtain a chloromethylated polysulfone (C). The chloromethylated polysulfone (C) had a degree of substitution (hereinafter referred to as DS), of a chloromethyl group per repeating unit, of 0.55.

70 g of dimethylacetamide and 5 g of chloromethylated polysulfone (DS=0.55) were added to a 250 ml round bottom flask, and then completely dissolved by mixing at room temperature, thereby obtaining Mixture 1.

40 g of dimethylacetamide, 13 g of ethylenediamine, and 26 g of triethylamine were added to a 100 ml round bottom flask and then mixed. The resultant mixture was added to Mixture 1, reacted in a nitrogen atmosphere at 80° C. for 24 hours, and then precipitated with methanol. The precipitated solution was filtered and vacuum dried at room temperature.

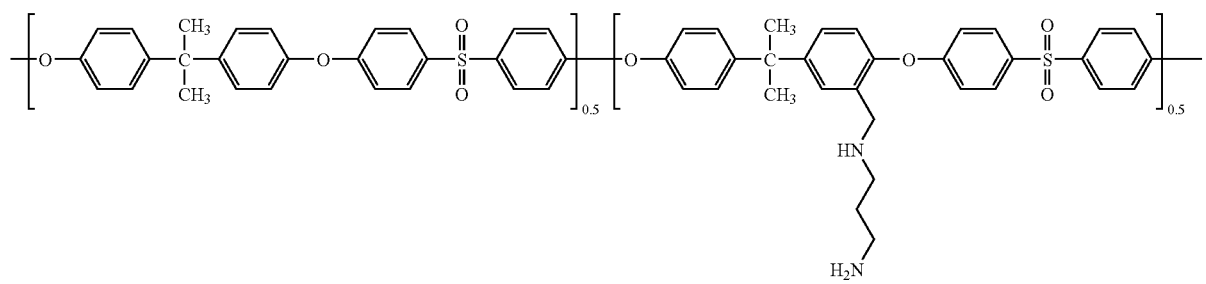

PSF-ED-1

Synthesis Example 2

Synthesis of PSF-ED-2

PSF-ED-2 was synthesized in the same manner as in Synthesis Example 1, except that the DS of the chloromethylated polysulfone used was 0.73, and the reaction was performed at 50° C. for 23 hours.

Synthesis Example 3

Synthesis of PSF-ED-3

PSF-ED-3 was synthesized in the same manner as in Synthesis Example 1, except that the DS of the chloromethylated polysulfone used was 0.9, and the reaction was performed at 50° C. for 26 hours.

Synthesis Example 4

Synthesis of Polysulfone-(1-(3-aminopropyl)imidazole-1 (PSF-API-1)

1) Synthesis of Chloromethylated Polysulfone(chloromethylated polysulfone) (C)

Referring to Reaction Scheme 3, 750 ml of chloroform and 14.88 g of polysulfone(B) were added to a 1000 ml round bottom flask and completely dissolved by mixing at room temperature. 10 g of paraformaldehyde, 0.8 ml of $SnCl_4$, and 42.5 ml of $(CH_3)_3SiCl$ were added to the reaction product and then reacted at 50° C. for 24 hours.

When the reaction was completed, the resultant solution was methanol precipitated and then filtered. The powder obtained from the filtering was vacuum dried at room temperature, to obtain a chloromethylated polysulfone (C). In the chloromethylated polysulfone, the DS of the chloromethyl group per repeating unit was 0.82.

NMR analysis of the chloromethylated polysulfone (C) was performed. The results are shown in FIG. 1. The chloromethylated polysulfone was identified with reference to FIG. 1.

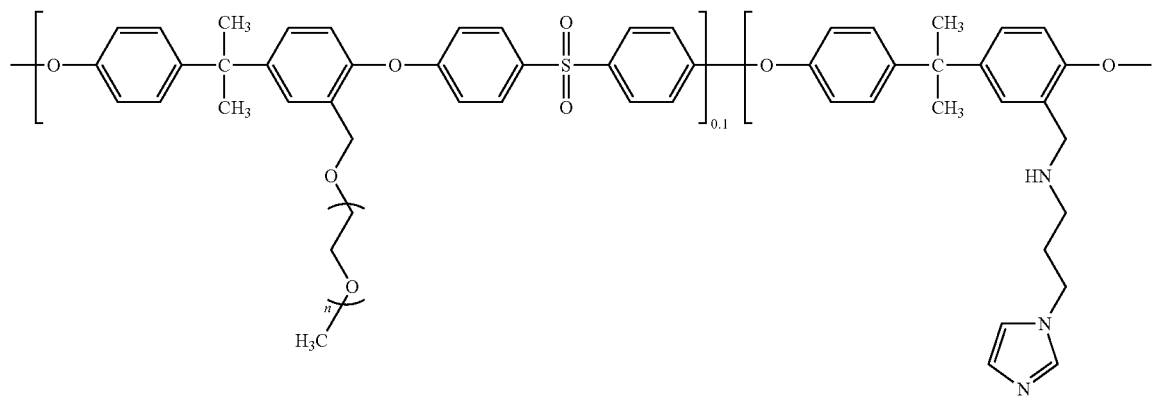

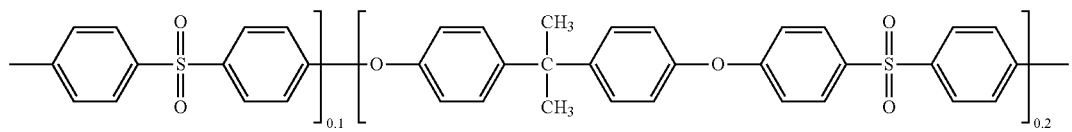

wherein n is 8.

2) Synthesis of Polysulfone-graf-PEG

[Reaction Scheme 4]

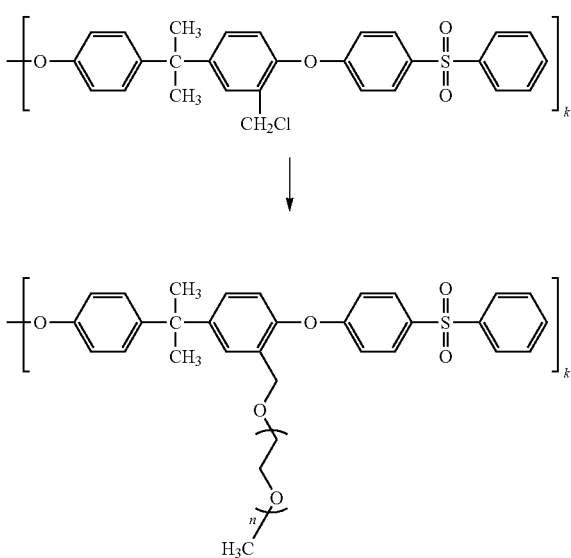

wherein n is 8, k that is a degree of polymerization is 140, and the weight average molecular weight is about 63,000.

75 ml of tetrahydrofurane and 3 g of chloromethylated polysulfone (C) were added to a 250 ml round bottom flask and then completely dissolved by mixing at room temperature, to obtain a Mixture 2.

Separately, 2.52 ml of THF and 0.02 g of NaH were added to a 10 ml flask and mixed, while a methoxypolypropyleneglycole (Mn 350 g/mol)(PEG-OH) solution (methoxypolyethyleneglycole 0.38 g, THF 1.13 ml) was slowly added thereto, using a dropping funnel. The reactants were reacted at room temperature for three hours, while nitrogen was purged, to obtain a brown solution. The brown solution was added to Mixture 2, reacted at room temperature for 72 hours, and then precipitated using a mixed solvent of ethanol and petroleum ether, in a volume ratio of 1:3, to form a precipitated solution.

The precipitated solution was filtered and an obtained solid was vacuum dried at room temperature, to obtain a polysulfone-graf-PEG represented by the formula below. The DS of a PEO [—CH$_2$O(CH$_2$CH$_2$O)$_n$CH$_3$], per polysulfone repeating unit, was 0.1.

Figure 2A:
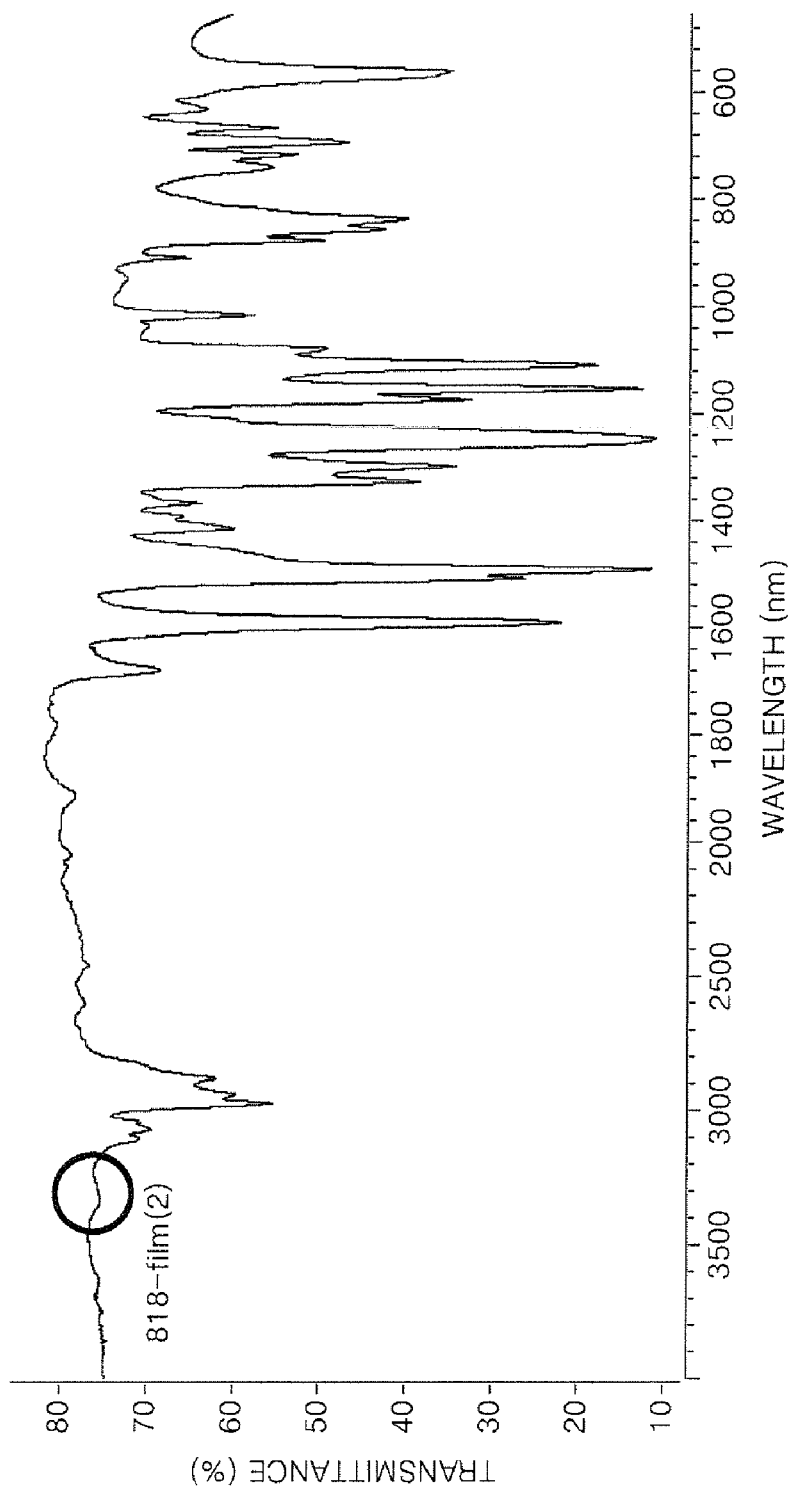
FIG. 2A is a view illustrating an IR analysis spectrum of a PSF-API-2 obtained according to Synthesis Example 5.
Figure 2B:
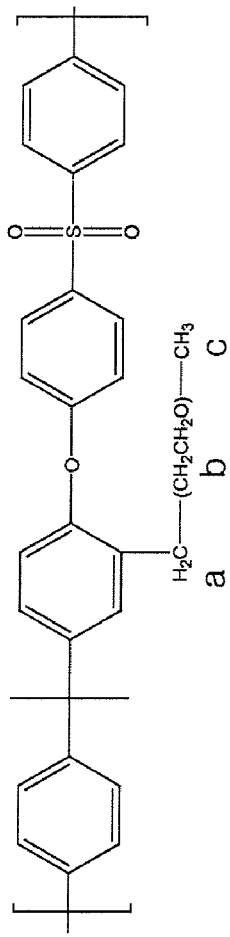
FIG. 2B is a view of an NMR spectrum of a polysulfone-graf-PEG obtained according to Synthesis Example 4.
Figure 2B:
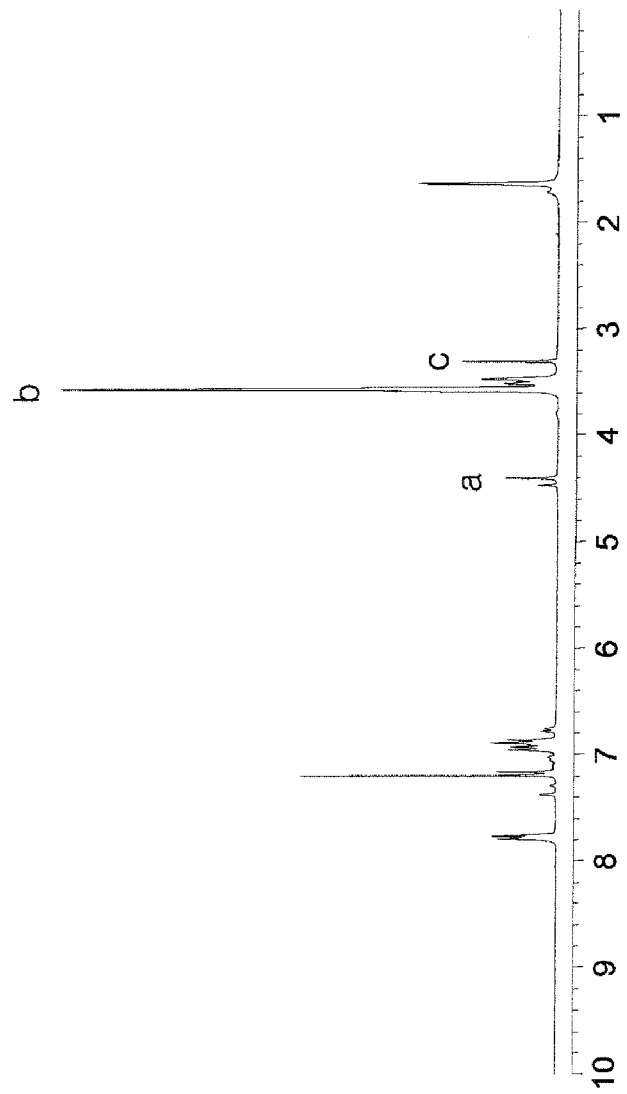

The polysulfone-graf-PEG was identified using an NMR analysis method. FIG. 2B is a view of an NMR spectrum of the polysulfone-graf-PEG obtained according to the Synthesis Example 4

Polysulfone-(1-(3-aminopropyl)imidazole-1 (PSF-API-1)

20 g of dimethylacetamide, 15.71 ml of 1-(3-aminopropyl)imidazole, and 12.7 ml of triethylamine were added to a 100 ml round bottom flask and mixed at room temperature. The polysulfone-graft-PEG, obtained as described above, was added to the mixture, reacted at 80° C. for 24 hours, and precipitated using methanol to form a precipitated solution. The precipitated solution was filtered and the obtained solid was vacuum dried at room temperature.

Synthesis Example5

Synthesis of PSF-API-2

PSF-API-2 was prepared in the same manner as in Synthesis Example 1, except that the DS of the chloromethyl group of the polysulfone was 0.9.

IR analysis of the PSF-API-2 was performed. FIG. 2A is a view illustrating an IR analysis spectrum of the PSF-API-2, obtained according to Synthesis Example 5. With reference to FIG. 2A, presence of an —NH functional group was identified.

Synthesis Example6

Synthesis of PSF-API-3

The PSF-API-2 was prepared in the same manner as in Synthesis Example 1, except that the DS of the chloromethyl group was 0.95.

The amounts of the amino group and the PEO {—CH$_2$O (CH$_2$CH$_2$)$_n$O)CH$_3$} per repeating unit of the PSF-ED-1 through PSF-ED-3 and the PSF-API-1 through PSF-API-3 were measured. The results are shown in Table 1.

TABLE 1

| | Number of Amino Group per Repeating Unit | Number of PEO Group per Repeating Unit |
|---|---|---|
| Synthesis Example 1 | 0.55 | — |
| Synthesis Example 2 | 0.73 | — |

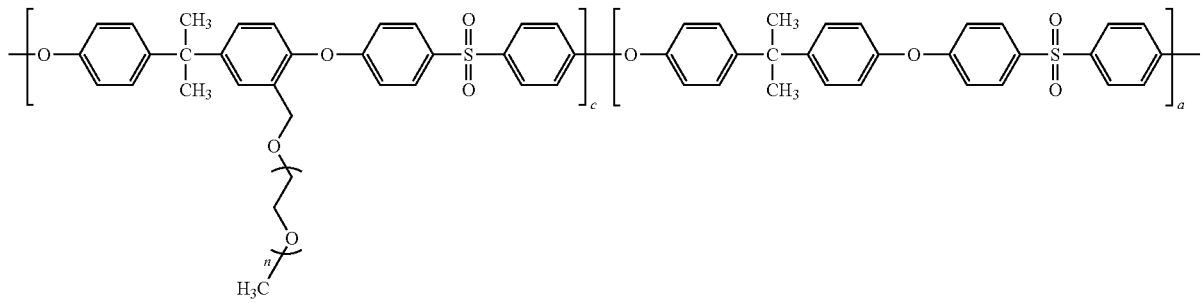

wherein c is 0.1, a is 0.9, and n is 8.

TABLE 1-continued

| | Number of Amino Group per Repeating Unit | Number of PEO Group per Repeating Unit |
|---|---|---|
| Synthesis Example 3 | 0.9 | — |
| Synthesis Example 4 | 0.72 | 0.1 |
| Synthesis Example 5 | 0.8 | 0.1 |
| Synthesis Example 6 | 0.85 | 0.1 |

Synthesis Example 7

Preparation of Polysulfone Blend

A polysulfone blend was obtained by mixing 0.7 g of the polysulfone PSF-ED-1 obtained according to Synthesis Example 1 and 0.3 g of polybenzimidazole.

Synthesis Example 8

Preparation of Polysulfone Blend

A polysulfone blend was obtained by mixing 0.5 g of the polysulfone PSF-ED-1 obtained according to Synthesis Example 1 and 0.5 g of polybenzimidazole.

Synthesis Example 9

Preparation of Polysulfone Blend

A polysulfone blend was obtained by mixing 0.3 g of the polysulfone PSF-ED-1 obtained according to Synthesis Example 1 and 0.7 g of polybenzimidazole.

Synthesis Example 10

Preparation of Cross-linked Product of Polysulfone
(When the Amount of a Cross-Linking Agent Used was 1 part by Weight Based on 100 Parts by Weight of the Total Weight of Polysulfone and Polybenzimidazole)

0.5 g of the polysulfone PSF-ED-1 obtained according to Synthesis Example 1, 0.5 g of polybenzimidazole, and 0.01 g of N,N-diglycidyl-4-glycidyloxyaniline acting as a cross-linking agent were added to 9 g of dimethylacetamide(DMAc) and mixed, to obtain a homogenous solution. The homogenous solution was heated at 80° C. for 3 hours, and at 110° C. for 1 hour, to obtain a cross-linked product of the polysulfone.

Synthesis Example 11

Preparation of Cross-linked Product of Polysulfone
(When the Amount of a Cross-Linking Agent Used was 2 Parts by Weight Based on 100 Parts by Weight of the Total Weight of Polysulfone and Polybenzimidazole)

A cross-linked product of polysulfone was prepared in the same manner as in Synthesis Example 10, except that 0.5 g of polysulfone PSF-ED-1 obtained according to Synthesis Example 1, 0.5 g of polybenzimidazole, and 0.02 g of N,N-diglycidyl-4-glycidyloxyaniline acting as a cross-linking agent were used.

Synthesis Example 12

Preparation of Cross-Linked Product of Polysulfone
(When the Amount of a Cross-Linking Agent Used was 3 Parts by Weight Based on 100 Parts by Weight of the Total Weight of Polysulfone and Polybenzimidazole)

A cross-linked product of the polysulfone was prepared in the same manner as in Synthesis Example 10, except that 0.5 g of the polysulfone PSF-ED-1 obtained according to Synthesis Example 1, 0.5 g of polybenzimidazole, and 0.03 g of N,N-diglycidyl-4-glycidyloxyaniline acting as a cross-linking agent were used.

Synthesis Example 13

Preparation of Cross-Linked Product of Polysulfone
(When the Amount of a Cross-Linking Agent Used was 4 Parts by Weight Based on 100 Parts by Weight of the Total Weight of Polysulfone and Polybenzimidazole)

A cross-linked product of the polysulfone was prepared in the same manner as in Synthesis Example 10, except that 0.5 g of polysulfone PSF-ED-1 obtained according to Synthesis Example 1, 0.5 g of polybenzimidazole, and 0.04 g of N,N-diglycidyl-4-glycidyloxyaniline acting as a cross-linking agent were used.

Example 1

Manufacturing of Electrolyte Membrane 0.5 g of polysulfone PSF-ED-1, obtained according to Synthesis Example 1, was added to 10 g of dimethylacetamide(DMAc), dissolved by mixing at 60° C., and filtered to produce a filtered solution. The filtered solution was dried on a Petri dish at 80° C. for 3 hours, to produce an electrolyte membrane. The thickness of the electrolyte membrane was 100 μm. The electrolyte membrane was immersed in 85 wt % phosphoric acid and heated at 80° C. for 1 hour. The phosphoric acid at the surface of the electrolyte membrane was removed.

Example 2

An electrolyte membrane was manufactured in the same manner as in Example 1, except that PSF-ED-2 was used instead of PSF-ED-1.

Example 3

An electrolyte membrane was manufactured in the same manner as in Example 1, except that PSF-ED-3 was used instead of PSF-ED-1.

Example 4

Manufacturing of Electrolyte Membrane 4.5 g of dimethyl acetamide and 0.5 g of PSF-API-1 were added to a 20 ml vial, and then completely dissolved by mixing at room temperature.

A polysulfone-graf-PEG-API solution was dropped onto a Petri dish and heated at 80° C. for three hours in a convection oven, to obtain an electrolyte membrane. The thickness of the electrolyte membrane was 100 μm. The electrolyte membrane was immersed in 85 wt % phosphoric acid and heated at 80° C. for one hour. The phosphoric acid at the surface of the electrolyte membrane was removed.

Example 5

An electrolyte membrane was manufactured in the same manner as in Example 4, except that the PSF-API-2 was used instead of the PSF-API-1.

Example 6

An electrolyte membrane was manufactured in the same manner as in Example 4, except that the PSF-API-3 was used instead of the PSF-API-1.

Example 7

0.1 g of the polysulfone blend obtained according to Synthesis Example 7 and 0.9 g of dimethylacetamide(DMAc) acting as a solvent were mixed and completely dissolved by stirring at room temperature. The mixture was heated at 80° C. for 3 hours, to obtain an electrolyte membrane. The thickness of the electrolyte membrane was 100 μm.

EXAMPLES 8-9

Electrolyte membranes were manufactured in the same manner as in Example 7, except that the polysulfone blends obtained according to Synthesis Examples 8 and 9 were used instead of the polysulfone blend obtained according to Synthesis Example 7.

Example 10

An electrolyte membrane was manufactured in the same manner as in Example 7, except that the cross-linked product obtained according to Synthesis Example 10 was used instead of the polysulfone blend obtained according to Synthesis Example 7.

EXAMPLES 11-13

Electrolyte membranes were manufactured in the same manner as in Example 10, except that the cross-linked products obtained according to Synthesis Examples 11, 12, and 13 were used instead of the cross-linked product obtained according to Synthesis Example 10.

COMPARATIVE EXAMPLE 1

9 g of dimethyl acetamide and 1 g of polybenzimidazole were added to a 20 ml vial and completely dissolved by mixing at room temperature.
The polybenzimidazole solution was dropped onto a Petri dish, and then heated at 80° C. for three hours in a convection oven to obtain an electrolyte membrane. The thickness of the electrolyte membrane was 100 μm.
The electrolyte membranes obtained according to Examples 1-6 and Comparative Example 1 were cut to a predetermined size, and the weight of each piece was measured. Then, the electrolyte membrane pieces were immersed in an 85% phosphoric acid solution and heated at 80° C. for 1 hour. The amount of the impregnated phosphoric acid was measured. The results are shown in Table 2. The amount of the impregnated phosphoric acid was measured according to Equation 1:

(weight of electrolyte membrane after impregnation with phosphoric acid)−(weight of electrolyte membrane before impregnation with phosphoric acid)/(weight of electrolyte membrane before impregnation with phosphoric acid)×100.   [Equation 1]

The ionic conductivity of the electrolyte membranes obtained according to Examples 1 and 2 was measured at 150° C., using an impedance analyzer. The results are shown in Table 2.

TABLE 2

|  | Amount of Impregnated phosphoric acid (wt %) | Ionic Conductivity (150° C.) (S/cm) |
|---|---|---|
| Example 1 | 220 | $0.4 \times 10^{-2}$ |
| Example 2 | 250 | $0.7 \times 10^{-2}$ |
| Example 3 | 290 | $1.8 \times 10^{-2}$ |
| Example 4 | 290 | $1.75 \times 10^{-2}$ |
| Example 5 | 320 | $1.9 \times 10^{-2}$ |
| Example 6 | 400 | $2.2 \times 10^{-2}$ |
| Comparative Example 1 | 270 | $0.8 \times 10^{-2}$ |

The electrolyte membranes obtained according to Examples 1 and 7-9 were cut to a predetermined size, and the weight of each piece was measured. Then, the electrolyte membrane pieces were immersed in an 85% phosphoric acid solution, heated at 80° C. for 1 hour, and the amount of the impregnated phosphoric acid was measured. The amount of the impregnated phosphoric acid was measured according to Equation 1. The results are shown in Table 3.

TABLE 3

|  | Amount of Impregnated phosphoric acid (wt %) | Ionic Conductivity (150° C.) (S/cm) |
|---|---|---|
| Example 1 | 220 | $0.4 \times 10^{-2}$ |
| Example 7 | 244 | $1.0 \times 10^{-2}$ |
| Example 8 | 324 | $1.1 \times 10^{-2}$ |
| Example 9 | 333 | $2.5 \times 10^{-2}$ |

Referring to Table 3, it was found that as the amount of polybenzimidazole acting as a thermoplastic resin increases, the amount of the impregnated phosphoric acid and ionic conductivity of an electrolyte membrane obtained using a polysulfone blend also increase.

The electrolyte membranes obtained according to Examples 10-13 were cut to a membrane pieces were immersed in 85% phosphoric acid solution and heated at 80° C. for 1 hour, and the amount of the impregnated phosphoric acid was measured. The amount of the impregnated phosphoric acid was measured according to Equation 1. The results are shown in Table 4.

TABLE 4

|  | Amount of Impregnated phosphoric acid (wt %) | Ionic Conductivity (150° C.) (S/cm) |
|---|---|---|
| Example 10 | 310 | $1.0 \times 10^{-2}$ |
| Example 11 | 280 | $0.9 \times 10^{-2}$ |
| Example 12 | 280 | $0.9 \times 10^{-2}$ |
| Example 13 | 250 | $0.8 \times 10^{-2}$ |

Referring to Table 4, it was found that as the amount of a cross-linking agent increased, the amount of the impregnated phosphoric acid, and the ionic conductivity of an electrolyte membrane using the cross-linked product of polysulfone, also decreased.

Example 14

Manufacturing of Fuel Cell

An anode was manufactured using PtRu-black (JM600) 1.34 mg/cm², a cathode was prepared by spraying a Pt/Co catalyst onto an anode and cathode diffusion layers at 2.53 mg/cm²(based on Pt) The electrolyte membrane obtained according to Example 5 was used as an electrolyte membrane. The anode, the cathode, and the electrolyte membrane were assembled at 125° C., by applying a pressure of 2 tons/cm² for 3 minutes to form a membrane electrode assembly (MEA.) The MEA is formed such that a catalyst layer and an electrode are sequentially deposited on both sides of a hydrogen ion conductive polymer membrane.

A hydrogen gas separation plate and an air supply separation plate were formed on the anode and the cathode, respectively, to manufacture a fuel cell. The hydrogen gas was supplied at a flow rate of about 100 ccm, and oxygen was supplied at a flow rate of about 250 ccm.

Example 15

Manufacturing of Fuel Cell

An anode was manufactured using PtRu-black (JM600) 1.23 mg/cm², a cathode was prepared by spraying a Pt/Co catalyst on anode and cathode diffusion layers at 2.53 mg/cm² (based on Pt), and the electrolyte membrane obtained according to Example 11 was used as an electrolyte membrane.

The anode, the cathode, and the electrolyte membrane were assembled at 125° C. by applying a pressure of 2 tons/cm² for 3 minutes to prepare a membrane electrode assembly (MEA.) The MEA is formed such that a catalyst layer and an electrode are sequentially deposited on both sides of a hydrogen ion conductive polymer membrane.

A hydrogen gas separation plate and an air supply separation plate were formed on the anode and the cathode, respectively, to manufacture a fuel cell. The hydrogen gas was supplied at a flow rate of about 100 ccm, and oxygen was supplied at a flow rate of about 250 ccm.

The performance of the fuel cells, manufactured according to Example 14 and Example 15, was measured. Under low humidity conditions, $H_2$ as a fuel was supplied to the anode at a flow rate of 100 ccm, air was supplied to the cathode at a flow rate of 250 ccm, and the operating temperature was 150+273° K. (150° C.).

Figure 3:
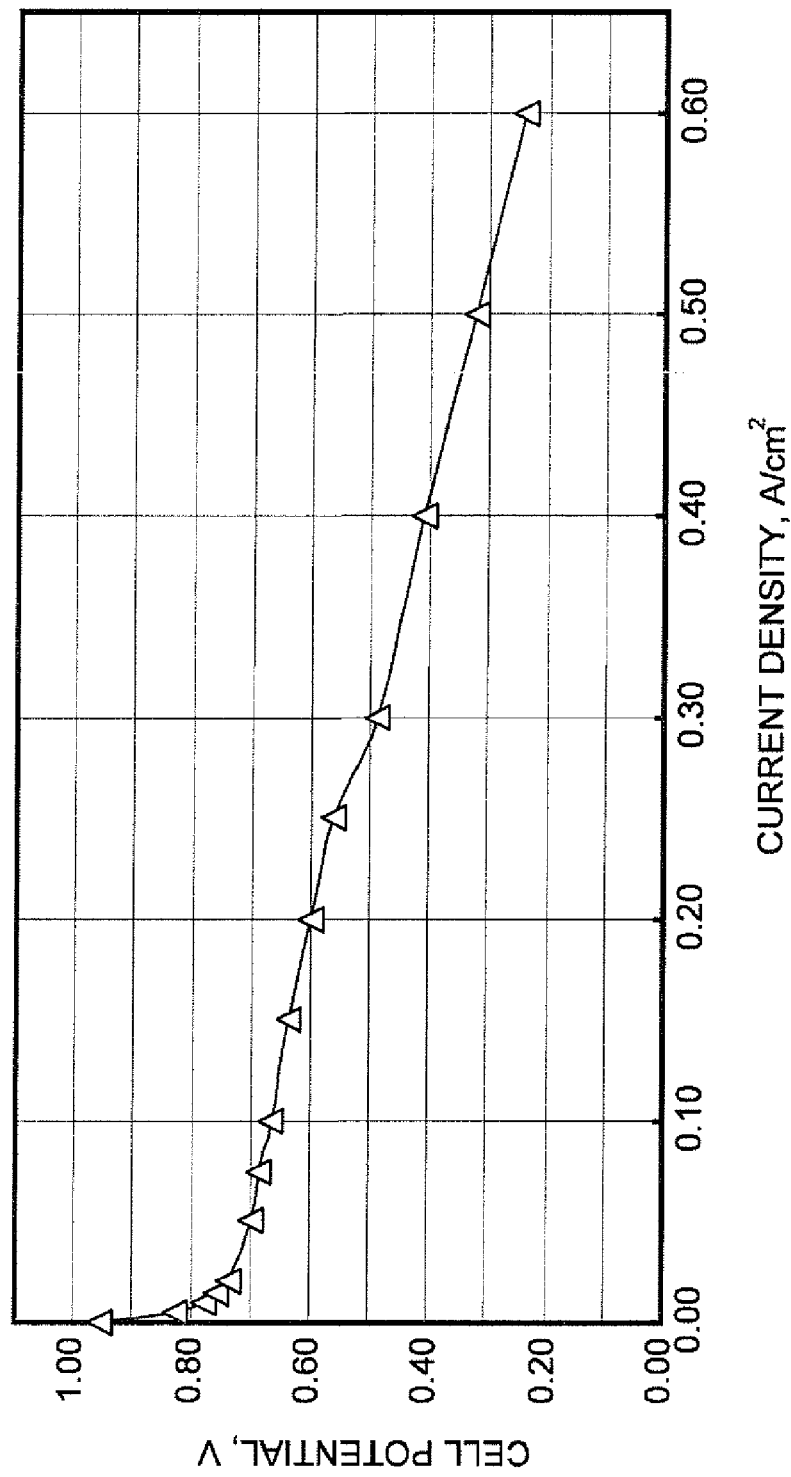
FIG. 3 is a graph illustrating the performance of a unit cell obtained according to Example 14.
Figure 4:
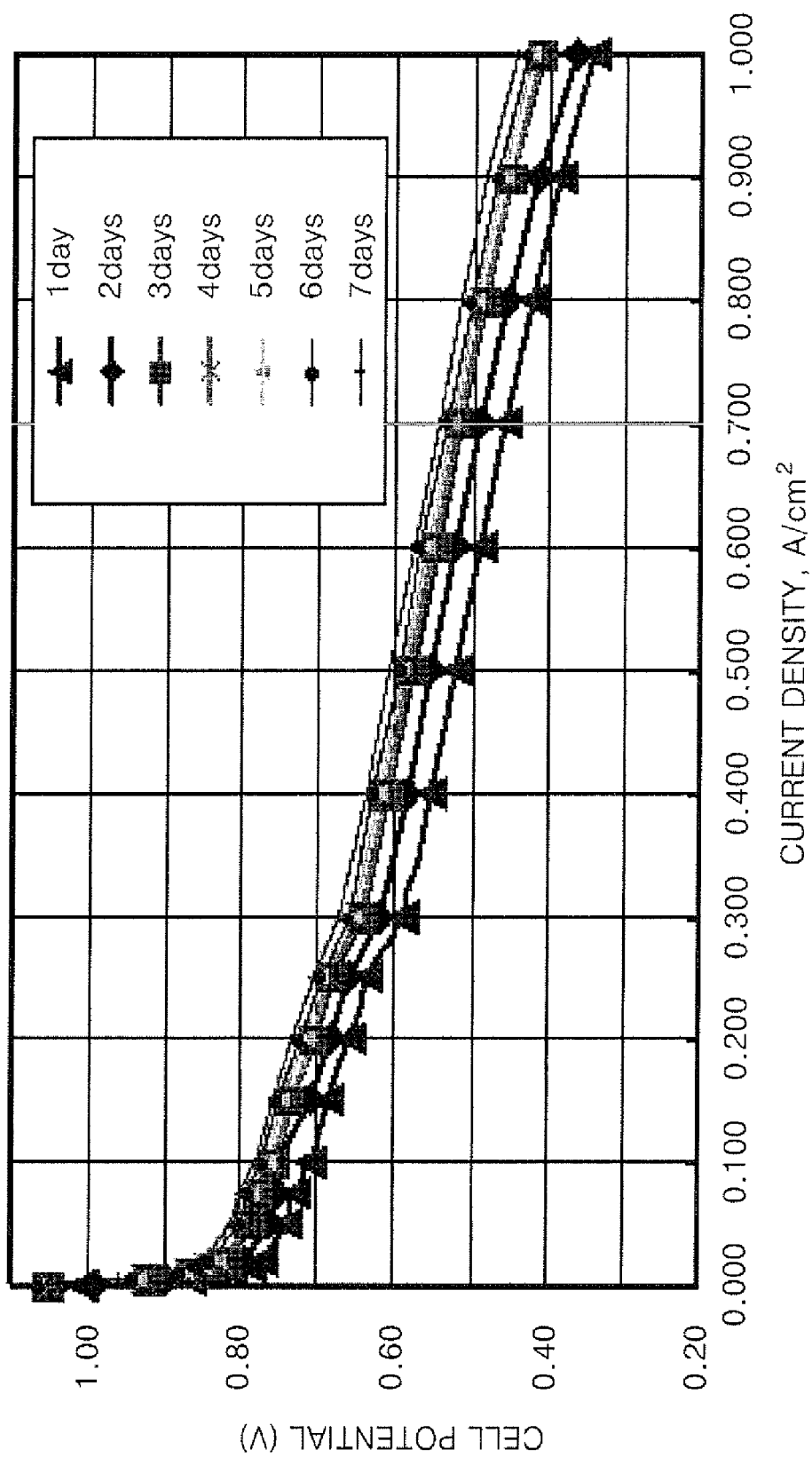
FIG. 4 is a graph illustrating the performance of a unit cell obtained according to Example 15.

FIG. 3 is a graph illustrating performance of the unit cell obtained according to Example 14, and FIG. 4 is a graph illustrating the performance of the unit cell obtained according to Example 15.

With reference to FIG. 3, it was found that the fuel cell manufactured according to Example 14 had good performance. With reference to FIGS. 3 and 4, it was found that a fuel cell using a polysulfone blend had better performance than a fuel cell using polysulfone.

A polysulfone according to the present invention includes a nitrogen-containing functional group that has an affinity to an acid, such as a phosphoric acid, and thereby has an excellent acid retaining ability. In an electrolyte membrane including the polysulfone and an acid, the amount of the retained acid can be controlled. Therefore, an electrolyte membrane according to the present invention has a high ionic conductivity and a high mechanical strength.

A polysulfone blend of polysulfone and a thermoplastic resin, according to aspects of the present invention, can prevent the dissolution of polysulfone in phosphoric acid, so that an electrolyte membrane using the polysulfone blend has an improved durability. According to aspects of the present invention, a cross-linked reaction product of a polysulfone and a cross-linking agent and a cross-linked reaction product of a polysulfone, a thermoplastic resin, and a cross-linking agent are strongly resistant to a phosphoric acid. Thus, a fuel cell using the cross-linked reaction products has a long lifetime.

The electrolyte membranes described above are suitable for use in a fuel cell, and in particular, in a high temperature fuel cell. A fuel cell including one of the electrolyte membranes has an excellent acid retaining ability. When the fuel cell operates, the loss of an acid can be prevented, the durability of the fuel cell can be improved, and the fuel cell can be easily manufactured. In addition, the fuel cell has high ionic conductivity and a high efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polysulfone, comprising:
a repeating unit represented by Formula 1:

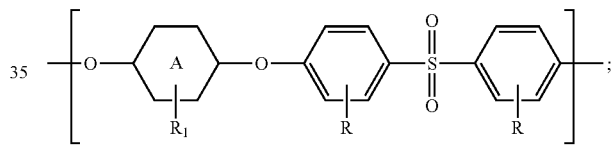

wherein 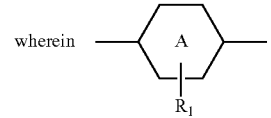

is selected from the group consisting of 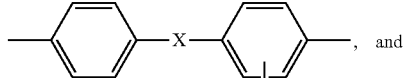

, and

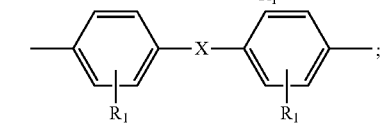

where X is selected from the group consisting of a single bond, —$CH_2$—, —$C(CH_3)_2$—, —$C(CF_3)_2$—, —$C(CCl_3)_2$—, —C(=O)—, and —O—; each $R_1$ is independently selected from the group consisting of a primary amino group, a secondary amino group, a tertiary amino group, a quaternary ammonium salt group, a C4-C30 alkyl heteroarylpyridinium salt group, a C4-C30 aryl heteroarylpyridinium salt group, a C4-C30 aralkyl heteroarylpyridinium salt group, and a combination thereof; and R comprises at least one selected from the group consisting of a hydrogen, a C1-C20 alkyl group, a C6-C20 aryl group, a C1-C20 alkoxy group, and a C6-C20 aryloxy group; and
a repeating unit represented by Formula 3:

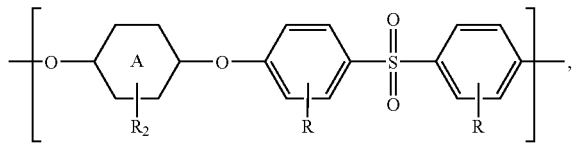

wherein 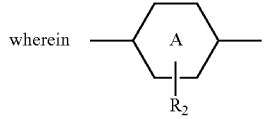

is selected from the group consisting of

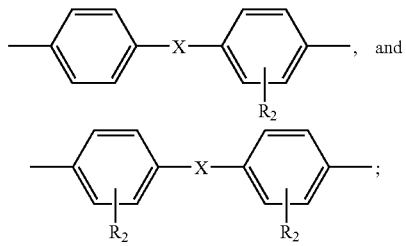

$R_2$ is selected from the group consisting of a C1-C20 alkyl group, a C1-C20 alkoxy group, a C6-C20 aryl group, a C6-C20 aryloxy group, a C7-C20 arylalkyl group, and —$CH_2O(CH_2CH_2O)_nCH_3$; n is an integer from 1 to 20; and R comprises at least one selected from the group consisting of a hydrogen, a C1-C20 alkyl group, a C6-C20 aryl group, a C1-C20 alkoxy group, and a C6-C20 aryloxy group,
wherein the polysulfone includes:
the repeating unit represented by Formula 1 in the range of 0.6-0.9 mole;
the repeating unit represented by Formula 3 in the range of 0.05-0.3 mole; and
a degree of polymerization in the range of 20-5000.

2. The polysulfone of claim 1, wherein each $R_1$ is selected from the group consisting of

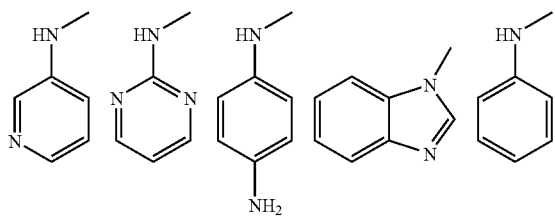

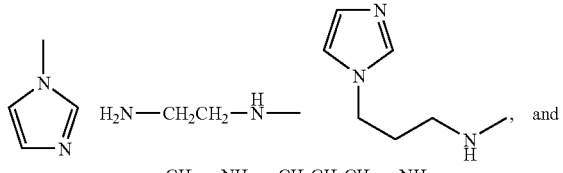

3. The polysulfone of claim 1, further comprising a repeating unit represented by Formula 2:

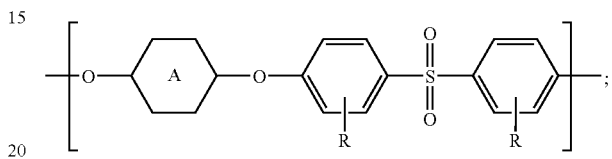

wherein

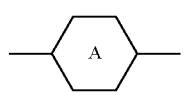

is selected from the group consisting of

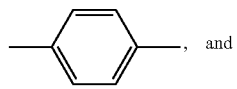

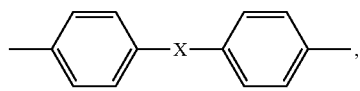

and R comprises at least one selected from the group consisting of a hydrogen, a C1-C20 alkyl group, a C6-C20 aryl group, a C1-C20 alkoxy group, and a C6-C20 aryloxy group.

4. The polysulfone of claim 3, wherein the polysulfone has:
the repeating unit represented by Formula 1 in the range of 0.6-0.9 moles;
the repeating unit represented by Formula 2 in the range of 0.1-0.3 moles;
the repeating unit represented by Formula 3 in the range of 0.05-0.3 moles; and
a degree of polymerization in the range of 20-5000.

5. The polysulfone of claim 3, wherein the polysulfone comprises a repeating unit represented by Formula 6:

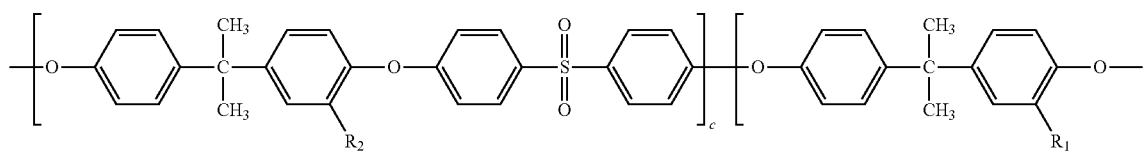

-continued

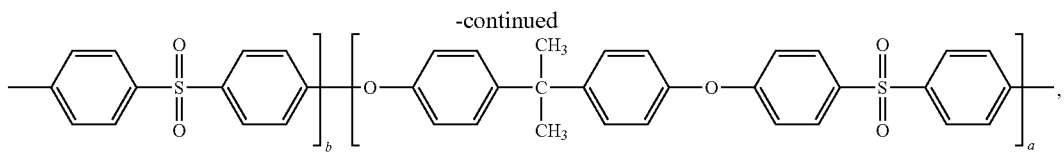

wherein $R_1$ is selected from the group consisting of

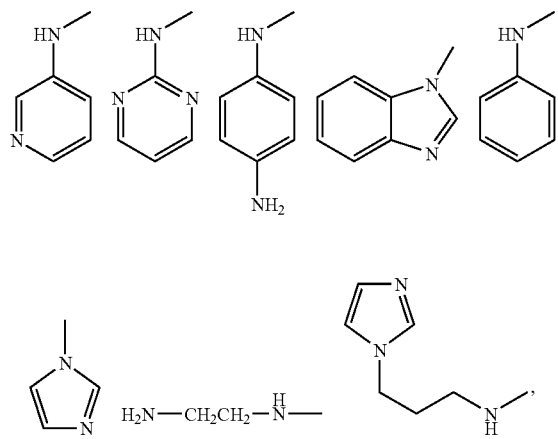

and —$CH_2$—NH—$CH_2CH_2CH_2$—$NH_2$; a is in the range of 0.1-0.3; b is in the range of 0.5-0.95; c is in the range of 0.05-0.3; and $R_2$ is —$CH_2O(CH_2CH_2O)_nCH_3$, wherein n is an integer from 1 to 20.

6. The polysulfone of claim 5, wherein the polysulfone comprises a repeating unit represented by Formula 7:

wherein a is in the range of 0.1-0.3, b is in the range of 0.6-0.9, c is in the range of 0.05-0.3, and n is an integer from 1 to 20.

7. A polysulfone blend, comprising the polysulfone of claim 1 and a thermoplastic resin.

8. The polysulfone blend of claim 7, wherein the thermoplastic resin comprises at least one compound selected from the group consisting of polybenzimidazole, polybenzooxazole, polypyridine, and polypyrimidine; and is in the amount of 10-80 parts by weight based on 100 parts by weight of the polysulfone.

9. An electrolyte membrane, comprising the polysulfone of claim 1 and an acid.

10. An electrolyte membrane, comprising the polysulfone blend of claim 7 and an acid.

11. A fuel cell, comprising a cathode, an anode, and the electrolyte membrane of claim 9 interposed between the cathode and the anode.

12. A fuel cell, comprising a cathode, an anode, and the electrolyte membrane of claim 10 interposed between the cathode and the anode.

13. The polysulfone of claim 3 wherein the repeating units represented by Formulae 1, 2, and 3 consist of a repeating unit represented by Formula 6a:

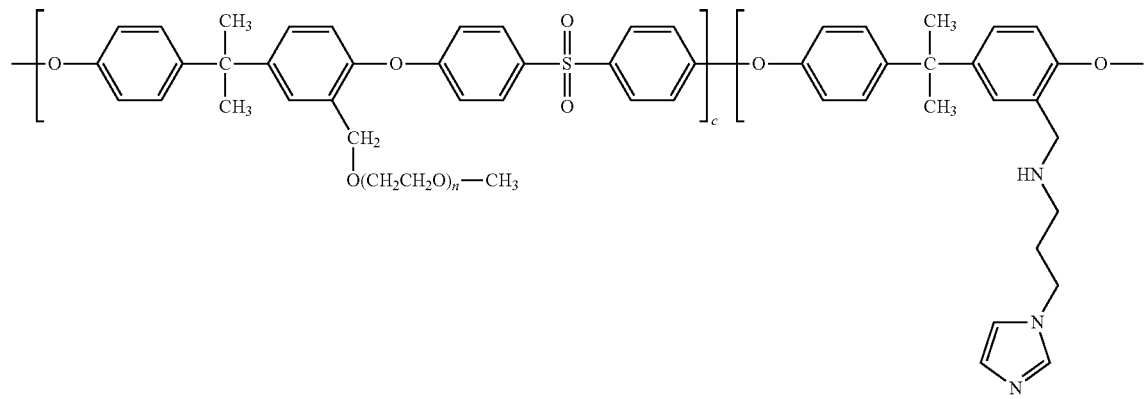

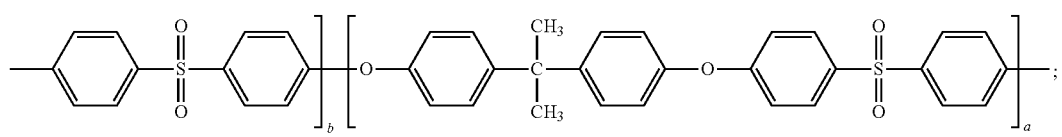

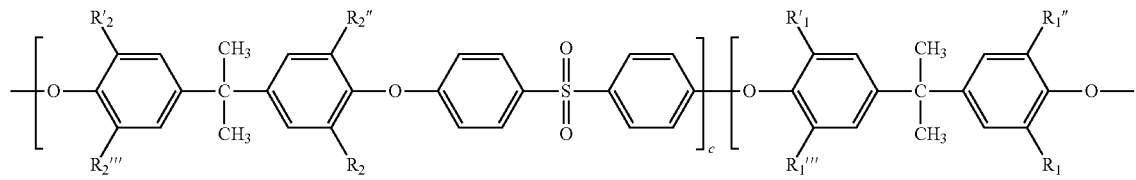

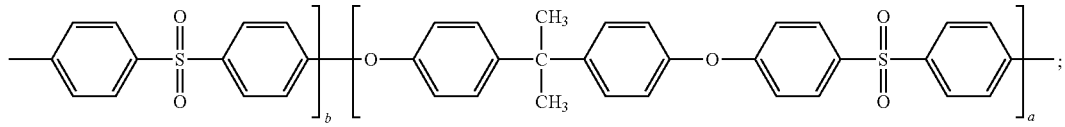

wherein $R_1$, $R_1'$, $R_1''$, and $R_1'''$ are selected from the group consisting of wherein $R_1$ is selected from the group consisting of

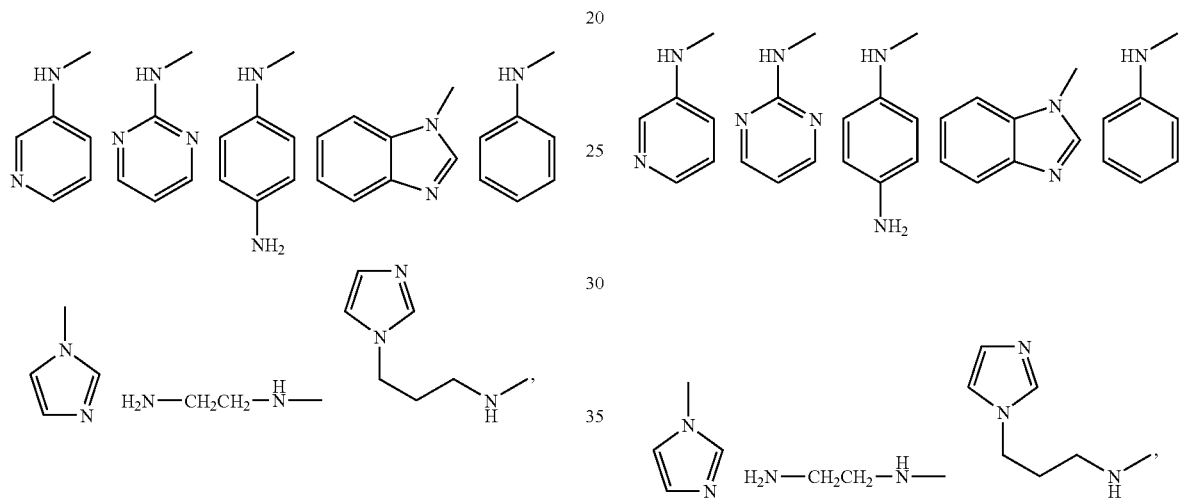

hydrogen, and —$CH_2$—NH—$CH_2CH_2CH_2$—$NH_2$;
$R_1$, $R_1'$, $R_1''$, and $R_1'''$ are not all hydrogen at the same time;
a is in the range of 0.1-0.3;
b is in the range of 0.6-0.9;
c is in the range of 0.05-0.3; and
$R_2$, $R_2'$, $R_2''$, and $R2'''$ are each independently hydrogen or —$CH_2O(CH_2CH_2O)_nCH_3$; n is an integer from 1 to 20, and $R_2$, $R_2'$, $R_2''$, and $R_2'''$ are not all hydrogen at the same time.

14. The polysulfone of claim 3, wherein the repeating units represented by Formulae 1, 2, and 3 consist of a repeating unit represented by Formula 6:

and —$CH_2$—NH—$CH_2CH_2CH_2$—$NH_2$; a is in the range of 0.1-0.3; b is in the range of 0.5-0.95; c is in the range of 0.05-0.3; and $R_2$ is —$CH_2O(CH_2CH_2O)_nCH_3$, wherein n is an integer from 1 to 20.

15. The polysulfone of claim 5, wherein the repeating unit represented by Formula 6 consists of a repeating unit represented by Formula 7:

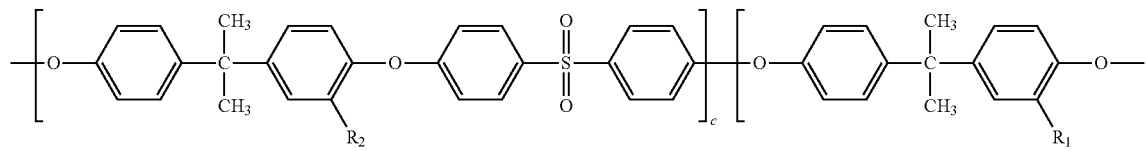

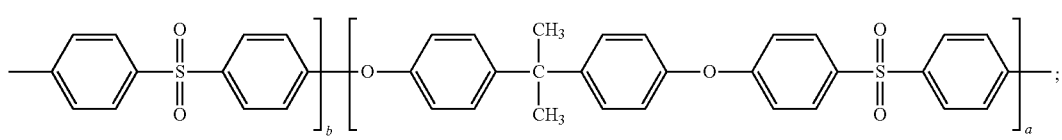

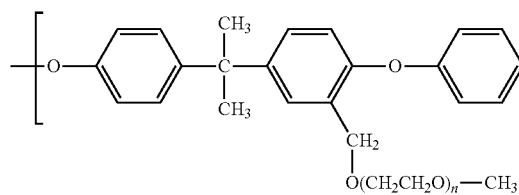

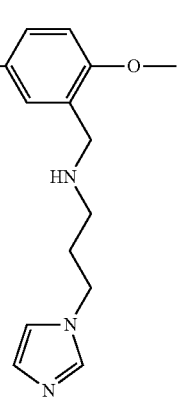

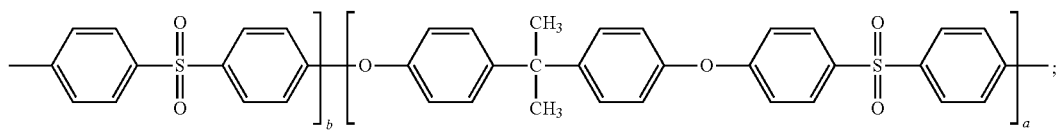

wherein a is in the range of 0.1-0.3, b is in the range of 0.6-0.9, c is in the range of 0.05-0.3, and n is an integer from 1 to 20.

16. A polysulfone, comprising:

a repeating unit represented by Formula 1:

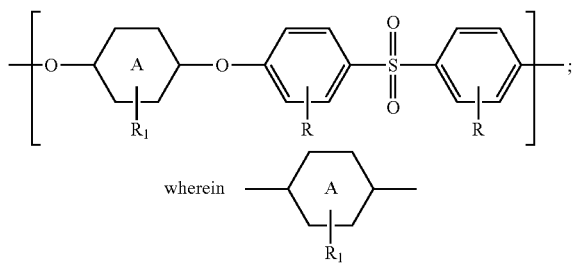

wherein 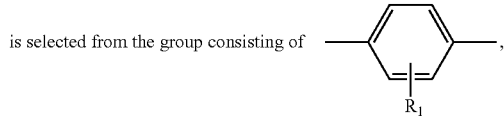 is selected from the group consisting of 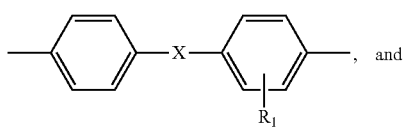, and 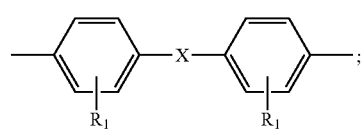;

where X is selected from the group consisting of a single bond, —CH$_2$—, —C(CH$_3$)$_2$—, —C(CF$_3$)$_2$—, —C(CCl$_3$)$_2$—, —C(=O)—, and —O—; each R$_1$ is independently selected from the group consisting of

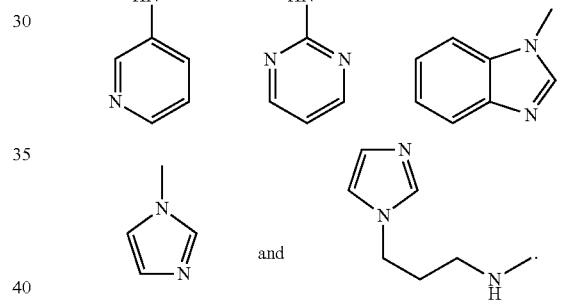

17. The polysulfone of claim 16, further comprising a repeating unit represented by Formula 2:

and R comprises at least one selected from the group consisting of a hydrogen, a C1-C20 alkyl group, a C6-C20 aryl group, a C1-C20 alkoxy group, and a C6-C20 aryloxy group.

18. The polysulfone of claim 17, wherein the polysulfone has:
   the repeating unit represented by Formula 1 in a range of 0.01-0.99 moles;
   the repeating unit represented by Formula 2 in a the range of 0.01-0.99 moles; and
   a degree of polymerization in the range of 20-5000.

19. The polysulfone of claim 17, wherein the polysulfone comprises a repeating unit represented by Formula 4:

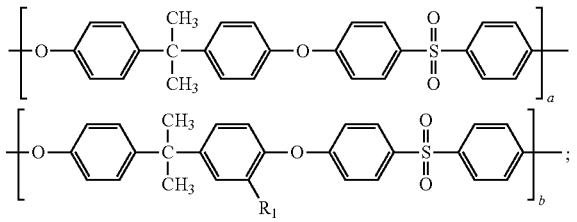

wherein $R_1$ is selected from the group consisting of

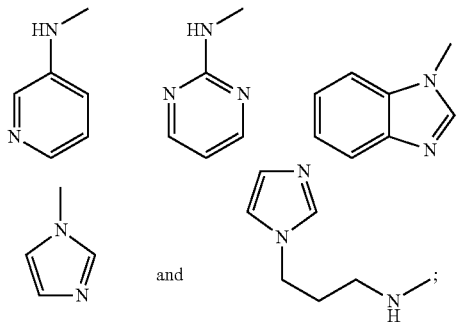

a is in the range of 0.01-0.6, and b is in the range of 0.4-0.99.

* * * * *